US012560720B1

(12) United States Patent
Khemka et al.

(10) Patent No.: US 12,560,720 B1
(45) Date of Patent: Feb. 24, 2026

(54) ILLUMINATED MULTI-VIEW SENSING USING REFLECTANCE FOR IN-CABIN APPLICATIONS

(71) Applicant: NVIDIA CORPORATION, Santa Clara, CA (US)

(72) Inventors: Animesh Khemka, Fremont, CA (US); Robin Brian Jenkin, Morgan Hill, CA (US); Wangren Xu, San Jose, CA (US); Balaji Srinivas Holur, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/811,169

(22) Filed: Aug. 21, 2024

(51) Int. Cl.
*G01S 17/894* (2020.01)
*G01S 17/93* (2020.01)
(Continued)

(52) U.S. Cl.
CPC ............ *G01S 17/894* (2020.01); *G01S 17/93* (2013.01); *G06T 5/92* (2024.01); *G06T 5/40* (2013.01);
(Continued)

(58) Field of Classification Search
CPC ......... G01S 17/894; G01S 17/93; G06T 5/92; G06T 5/40; G06T 2207/10028; G06T 2207/20081; G06T 2207/20084
See application file for complete search history.

(56) References Cited

U.S. PATENT DOCUMENTS 10,885,698 B2    1/2021  Muthler et al.
2018/0126901 A1*  5/2018  Levkova .............. B60W 40/09
(Continued)

OTHER PUBLICATIONS

Hendrick P. A. Lensch, et al. "Image-Based Reconstruction of Spatial Appearance and Geometric Detail," ACM Transactions on Graphics, vol. 22, pp. 234-257, Apr. 2003, 24 pg.
(Continued)

*Primary Examiner* — Thai Q Tran
*Assistant Examiner* — Jose M Mesa
(74) *Attorney, Agent, or Firm* — Freestone Intellectual Property Law PLLC; Wesley A. Horner

(57) ABSTRACT

Optical sensors (e.g., cameras) and (e.g., IR) illumination sources may be distributed in an environment (e.g., an interior space such as a cabin or cockpit of an ego-machine) and synchronized to generate frames of sensor data. By positioning the optical sensors and assigning them corresponding frequency ranges, the resulting sensor data (e.g., images from different perspectives and with different illumination patterns) may be used to extract reflectance data, the reflectance data may be used to generate more accurate sensor data (e.g., HDR images, images re-rendered using an extracted bidirectional reflectance distribution function), and the resulting sensor data may be used in one or more downstream tasks, such as operator or occupant monitoring or detection tasks (e.g., gaze detection, pose detection, attentiveness or fatigue assessment, facial recognition, gesture recognition, occupant presence detection, child presence detection, seat belt detection, hands-on-wheel detection, etc.), generating visualizations (e.g., video conference calls), and/or otherwise.

20 Claims, 12 Drawing Sheets

(51) Int. Cl.
　G06T 5/40　　　　(2006.01)
　G06T 5/92　　　　(2024.01)

(52) U.S. Cl.
　CPC ............... *G06T 2207/10028* (2013.01); *G06T 2207/20081* (2013.01); *G06T 2207/20084* (2013.01)

(56)　　　　　References Cited

U.S. PATENT DOCUMENTS

| | | | | |
|---|---|---|---|---|
| 2019/0265712 | A1* | 8/2019 | Satzoda | B60W 40/09 |
| 2019/0355178 | A1 | 11/2019 | Hermina Martinez et al. | |
| 2020/0314333 | A1 | 10/2020 | Liang et al. | |
| 2020/0380726 | A1 | 12/2020 | Graefling et al. | |
| 2023/0115478 | A1 | 4/2023 | Shin et al. | |
| 2023/0204781 | A1* | 6/2023 | Thakur | G01S 17/894 |
| | | | | 356/5.01 |
| 2023/0334788 | A1* | 10/2023 | Zohni | G06F 3/012 |
| 2023/0336847 | A1* | 10/2023 | Alakarhu | H04N 23/56 |

OTHER PUBLICATIONS

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

Taxonomy and Definitions for Terms Related to Driving Automation Systems for On-Road Motor Vehicles, National Highway Traffic Safety Administration (NHTSA), A Division of the US Department of Transportation, and the Society of Automotive Engineers (SAE), Standard No. J3016-201806, pp. 1-35 (Jun. 15, 2018).

Taxonomy and Definitions for Terms Related to Driving Automation Systems for On-Road Motor Vehicles, National Highway Traffic Safety Administration (NHTSA), A Division of the US Department of Transportation, and the Society of Automotive Engineers (SAE), Standard No. J3016-201609, pp. 1-30 (Sep. 30, 2016).

Marschner, Stephen Robert. Inverse rendering for computer graphics. Cornell University, 1998.

NVIDIA: A Lightweight Approach for On-the-Fly Reflectance Estimation https://research.nvidia.com/publication/2017-10_lightweight-approach-fly-reflectance-estimation Accessed: Jun. 10, 2024 p. 2.

Yu, Yizhou et al. "Recovering photometric properties of architectural scenes from photographs." Proceedings of the 25th annual conference on Computer graphics and interactive techniques. 1998, 12 pgs.

Yu, Yizhou, et al. "Inverse global illumination: Recovering reflectance models of real scenes from photographs." Proceedings of the 26th annual conference on Computer graphics and interactive techniques. 1999 13 pgs.

Notice of Allowance, U.S. Appl. No. 18/811,199, Notification Date: Oct. 14, 2025, 13 pages.

\* cited by examiner

100

SENSOR DATA GENERATION COMPONENT 175

TASK(S) 190

SHAPE EXTRACTION COMPONENT 185

REFLECTANCE EXTRACTION COMPONENT 170

3D RECONSTRUCTION COMPONENT 180

155

OPTICAL SENSORS 150

EMITTERS 160

CONTROL COMPONENT 110

SYNCHRONIZATION COMPONENT 120

INTENSITY CONTROL COMPONENT 130

AMBIENT LIGHT SENSOR(S) 140

300

GENERATE IMAGE DATA
FROM MULTIPLE PERSPECTIVES
WITH MULTIPLE ILLUMINATION PATTERNS
B302

ESTIMATE BIDIRECTIONAL REFLECTANCE
DISTRIBUTION FUNCTION (BRDF)
B304

RE-RENDER IMAGE DATA USING THE BRDF
B306

400

500

GENERATE, USING A PLURALITY OF OPTICAL SENSORS SYNCHRONIZED WITH LIGHT EMITTERS DISTRIBUTED WITHIN AN INTERIOR SPACE OF AN EGO-MACHINE, IMAGE DATA REPRESENTING AT LEAST A PORTION OF AN INTERIOR SPACE
B502

EXTRACT, BASED AT LEAST ON THE IMAGE DATA, REFLECTANCE DATA ENCODING ONE OR MORE REFLECTANCE VALUES REPRESENTATIVE OF AT LEAST THE PORTION OF THE INTERIOR SPACE
B504

EXECUTE ONE OR MORE OPERATIONS OF THE EGO-MACHINE BASED AT LEAST ON THE REFLECTANCE DATA
B506

GENERATE, USING A PLURALITY OF OPTICAL SENSORS AND LIGHT EMITTERS DISTRIBUTED WITHIN AN INTERIOR SPACE OF AN EGO-MACHINE, IMAGE DATA REPRESENTING AT LEAST A PORTION OF THE INTERIOR SPACE
B602

GENERATE, BASED AT LEAST ON THE IMAGE DATA, A REPRESENTATION OF A RECONSTRUCTED THREE-DIMENSIONAL (3D) SURFACE CORRESPONDING TO AT LEAST A PORTION OF THE INTERIOR SPACE
B604

CONTROL, BY AN OCCUPANT OR OPERATOR MONITORING SYSTEM, ONE OR MORE OPERATIONS OF THE EGO-MACHINE BASED AT LEAST ON THE RECONSTRUCTED 3D SURFACE
B606

ILLUMINATED MULTI-VIEW SENSING USING REFLECTANCE FOR IN-CABIN APPLICATIONS

BACKGROUND

Autonomous and semi-autonomous vehicles and other machines rely on machine learning approaches—such as those using deep neural networks (DNNs)—to analyze images of an interior space (e.g., cabin, cockpit). An Occupant Monitoring System (OMS) is an example of a system that may be used within a vehicle cabin to perform real-time assessments of occupant or operator presence, gaze, alertness, and/or other conditions. For example, OMS sensors (e.g., red, green, and blue or "RGB" sensors, infrared (IR) sensors, depth sensors, cameras, and/or other optical sensors) may be used to track an occupant's or operator's gaze direction, head pose, and/or blinking. This information may be used to determine a level of attentiveness of the occupant or operator (e.g., to detect drowsiness, fatigue, and/or distraction), and/or to take responsive action to prevent harm to the occupant or operator—e.g., by redirecting their attention to a potential hazard, pulling the vehicle over, and/or the like. For example, DNNs may be used to detect that an operator is falling asleep at the wheel (e.g., based on the operator's downward gaze toward the floor of the vehicle), and the detection may lead to an adjustment in the speed and/or direction of the vehicle (e.g., pulling the vehicle over to the side of the road) or an auditory alert to the operator.

Conventional OMSs have a variety of challenges and drawbacks. For example, some OMSs seek to perform tasks like driver distraction detection, drowsiness detection, hands-on-wheel detection, three-dimensional (3D) pose estimation, monocular depth estimation, and/or child presence detection with high accuracy under different operating conditions. However, some operating conditions can limit or negatively impact the accuracy of sensor data and the corresponding accuracy of downstream tasks. For example, low-light conditions such as driving at night or in poorly lit environments can reduce the efficacy of cameras and other optical sensors, resulting in grainy or unclear images. Reflections from surfaces like windows or shiny interior materials can distort sensor readings, leading to inaccuracies. Depth ambiguities can arise when multiple objects such as passengers, seats, or personal items are in close proximity (e.g., a child sitting close to a large bag may be misinterpreted as a single entity), or reflections from shiny surfaces or windows can create false depth cues. Furthermore, occlusions (e.g., passengers or large bags blocking a sensor's line of sight) can impede generation of a complete and accurate representation of the cabin environment.

Some RGB/IR cameras that capture both visible (e.g., RGB) light and IR light use an IR emitter to illuminate the scene with IR light. IR light at a wavelength of 940 nm is often used because the human eye is generally insensitive to light at wavelengths above 700 nm. Since IR light is essentially invisible to humans, IR illumination can occur without disturbing or distracting the driver or passengers. Further, sunlight contains more light at 850 nm compared to 940 nm. By using 940 nm, systems can reduce interference from sunlight. In some existing systems, IR light-emitting diodes (LEDs) or vertical-cavity surface-emitting lasers (VCSELs) are integrated directly into the camera module to illuminate the camera's field of view. However, conventional IR illumination techniques tend to distribute IR light within the scene unevenly, and often omit some monitored areas (e.g., in rear seats or footwells). Furthermore, in conventional techniques, IR illumination often reflects off a subject's retina, causing their pupils to appear unusually bright, reducing contrast with the iris and introducing artifacts such as glare or halo effects around the eyes, which make it challenging for downstream tasks to accurately interpret eye features. Generally, IR light can have several degrading effects on the resulting image (e.g., IR light can act as contamination for color reproduction and result in color errors, can lower the dynamic range of a camera by introducing extra illumination in bright areas, etc.).

All these factors limit the effectiveness of downstream tasks such as those used in driver assistance systems and automated safety features, which typically rely on precise and reliable sensor data. As such, there is a need for improved sensing and/or detection techniques that generate sensor data more accurately and/or with sharper detail, and/or that facilitate improved detection accuracy from such sensor data.

SUMMARY

Embodiments of the present disclosure relate to illuminated multi-view sensing for in-cabin applications. Systems and methods are disclosed that distribute and use optical sensors (e.g., cameras) and (e.g., IR) illumination sources to extract reflectance data and/or 3D surface(s) in an interior space, such as a cabin or cockpit of an ego-machine. The illuminators may be positioned relative to the optical sensors to avoid direct glare into the optical sensors to reduce the risk of introducing reflections and distortions in sensor data. In some embodiments, IR (e.g., LED and VSCEL) emitters may be distributed within a scene (e.g., in the cabin or cockpit of an ego-machine) by integrating the IR emitters behind one or more displays, devices, instruments, light fixtures, or some other apparatus with an IR transmissive (e.g., plastic) covering. As such, the optical sensors (e.g., cameras) and (e.g., concealed IR) illuminator(s) may be synchronized to generate combinations of sensor data (e.g., images) with different illumination patterns.

In some embodiments, the intensity of each IR illuminator may be adapted based on an amount of detected light. For example, an increase or decrease in ambient IR light (e.g., the ratio of detected IR to green light intensity) from frame to frame may be detected using one or more ambient sensors positioned in a particular target region and/or using sensor data (e.g., images) representing the target region, and IR illumination for that region may be decreased in response to a detected increase in ambient IR light (or vice versa) independently of IR illumination of other region(s). In some embodiments, ambient sensors and/or images of a target region may be used to generate a spatial map quantifying the spatial distribution of a measure of detected light intensity (e.g., the ratio of detected IR to green light intensity) across the target region, and the intensity of the illuminators may be adapted to a detected gradient in the spatial distribution.

In some embodiments, the distributed optical sensors and illuminators may be used to extract reflectance data such as a BRDF or one or more reflectance maps representing a measure of the reflectance of the target region being monitored (e.g., in the cabin), and the extracted reflectance data may be used to support one or more downstream tasks, such as operator or occupant monitoring or detection tasks (e.g., gaze detection, pose detection, attentiveness or fatigue assessment, facial recognition, gesture recognition, occupant presence detection, child presence detection, seat belt detection, hands-on-wheel detection, etc.), generating visualizations (e.g., video conference calls), and/or otherwise.

Additionally or alternatively, the distributed optical sensors and illuminators may be used to reconstruct 3D geometry and/or 3D pose of an occupant, operator, or other object in the environment. For example, stereo vision may be used to generate one or more depth maps from image data generated using different cameras, the depth map(s) may be transformed into a 3D point cloud, and surface reconstruction may be applied to reconstruct the 3D geometry of surface(s) in the environment. A 3D pose, one or more keypoints (e.g., facial landmarks), or some other representation of the shape of the reconstructed surface(s) may be extracted from the reconstructed surface and used in one or more downstream tasks, such as driver and/or occupant monitoring tasks.

As such, the techniques described herein may be used to generate illuminated multi-view RGB and IR images or videos and/or perform one or more detection tasks using such images or videos. Using the techniques described herein, the reflectance of monitored subjects or other objects may be detected and used to generate more accurate sensor data (e.g., images) with sharper detail than prior techniques, and/or 3D geometry of the objects may be reconstructed, and the resulting data may be used to improve the accuracy of downstream detection tasks over prior techniques.

BRIEF DESCRIPTION OF THE DRAWINGS

The present systems and methods for illuminated multi-view sensing for in-cabin applications are described in detail below with reference to the attached drawing figures, wherein:

FIG. 5 is a flow diagram showing a method for executing one or more operations of an ego-machine based at least on reflectance data encoding one or more reflectance values representative of the interior space of the ego-machine, in accordance with some embodiments of the present disclosure;

FIG. 6 is a flow diagram showing a method for executing one or more operations of an ego-machine based at least on a representation of a reconstructed 3D surface in the interior space of the ego-machine, in accordance with some embodiments of the present disclosure;

DETAILED DESCRIPTION

Figure 1:
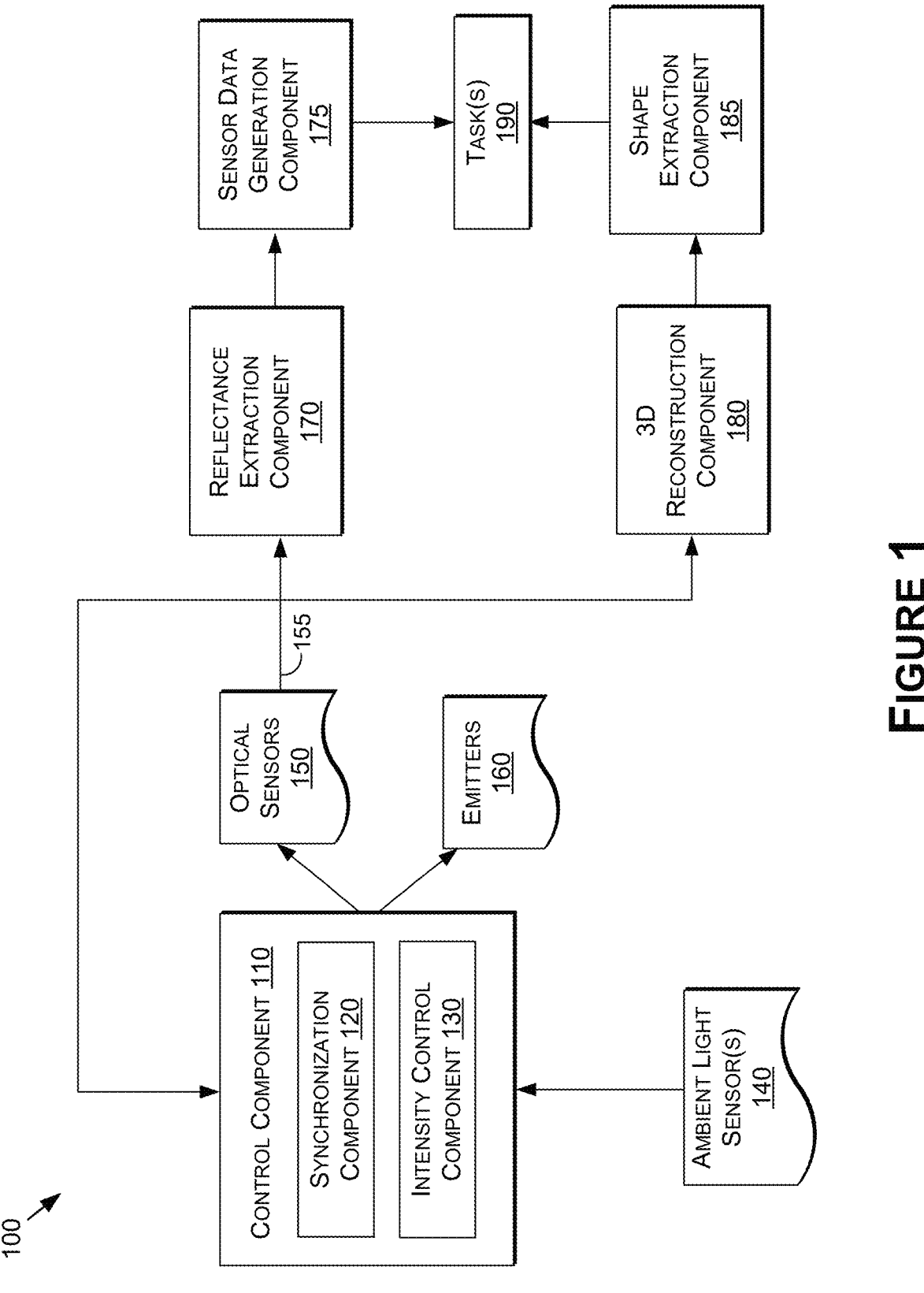
FIG. 1 is a data flow diagram illustrating an example multi-view sensing pipeline, in accordance with some embodiments of the present disclosure.

Systems and methods are disclosed related to illuminated multi-view sensing for in-cabin applications. For example, systems and methods are disclosed that distribute and use optical sensors (e.g., cameras) and (e.g., IR) illumination sources in an environment (e.g., an interior space such as a cabin or cockpit of an ego-machine) to synchronize generation of sensor data. By positioning the optical sensors and assigning them corresponding frequency ranges, the resulting sensor data (e.g., images from different perspectives and with different illumination patterns) may be used to extract reflectance data, the reflectance data may be used to generate more accurate sensor data (e.g., high dynamic range (HDR) images, images re-rendered using an extracted bidirectional reflectance distribution function (BRDF)), and the resulting sensor data may be used in one or more downstream tasks. Additionally or alternatively, the optical sensors may be used to reconstruct the 3D geometry and/or 3D pose of an occupant or operator, and the reconstructed 3D pose may be used in one or more downstream tasks. The present techniques may be used to perform one or more detection tasks in Occupant Monitoring Systems, security systems, systems for photography or scientific or environmental research, and/or other types of systems.

Although the present disclosure may be described with respect to an example autonomous or semi-autonomous vehicle or machine 700 (alternatively referred to herein as "vehicle 700" or "ego-machine 700," an example of which is described with respect to FIGS. 7A-7D), this is not intended to be limiting. For example, the systems and methods described herein may be used by, without limitation, non-autonomous vehicles or machines, semi-autonomous vehicles or machines (e.g., in one or more advanced driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. In addition, although the present disclosure may be described with respect to driver or occupant monitoring, this is not intended to be limiting, and the systems and methods described herein may be used in augmented reality, virtual reality, mixed reality, robotics, security and surveillance, autonomous or semi-autonomous machine applications, and/or any other technology spaces where sensing and detection may be used.

Generally, optical sensors may be positioned and/or oriented in various ways depending on the application (e.g., the sensing and/or detection task) and/or the embodiment. For example, optical sensors may be positioned with different viewing angles around a target region and with overlapping fields of view such that target regions of interest are observed from multiple perspectives. Furthermore, a plurality of light sources (or illuminators) such as IR emitters may be positioned and/or oriented in various ways. For example, multiple light sources may be used to illuminate the scene from different directions to reduce shadows and ensure surfaces are well-lit. The illuminators may be positioned relative to the optical sensors to avoid direct glare into the optical sensors to reduce the risk of introducing reflections and distortions in sensor data. The optical sensors and/or illuminators may be positioned at varying heights to capture details from multiple vertical perspectives (e.g., some sensor(s) may be positioned at a lower elevation and oriented upward, while other sensor(s) may be positioned at a higher elevation such as ceiling height and oriented downward). The optical sensors and/or illuminators may be positioned or oriented with complementary angles and/or heights (e.g., if a camera is placed at a lower elevation, an illuminator may be placed at a higher elevation; positioning cameras and illuminators using cross-lighting, angular offsets, or triangulated lighting; etc.), and/or may be positioned or oriented with some oblique viewing angle (e.g., between 30 and 60 degrees) relative to a target surface being observed to reduce direct reflections.

One application for visible and infrared imaging is in an OMS, which may be used within a vehicle cabin to perform hands-on-wheel detection, 3D pose estimation, monocular depth estimation, child presence detection, and/or other real-time assessments of occupant and/or operator presence, gaze, alertness, and/or other conditions. Depending on the volume being monitored, one or more target regions may be defined (e.g., a particular seat in the vehicle, a row of seating, etc.), and multiple OMS sensors (e.g., RGB cameras, infrared cameras, combined RGB/infrared (RGB/IR) cameras) may be positioned at various locations throughout the vehicle interior to cover each target region from multiple perspectives. OMS sensors may be positioned within a steering column (e.g., facing the driver), in the rear review mirror (e.g., facing the driver or the cabin), in an infotainment console (e.g., facing the driver or the cabin), in a vehicle pillar (e.g., facing a particular row of seating), above a row of headrests (e.g., facing forward for child detection), etc. OMS sensors are just one possible application for the present techniques, and other applications are contemplated within the scope of the present disclosure.

In some embodiments, IR (e.g., LED and VSCEL) emitters may be distributed within a scene (e.g., in the cabin or cockpit of an ego-machine) by integrating the IR emitters behind one or more displays, devices, instruments, light fixtures, or some other apparatus with an IR transmissive (e.g., plastic) covering. For example, an IR emitter may be incorporated into a display assembly (e.g., on a display panel, circuit board, or backlight assembly), a digital instrument cluster, in a dashboard navigation system, a passenger or seatback entertainment system, in existing lighting fixtures, and/or other light emitting assemblies.

For example, displays and light fixtures are typically built using visible light emitting devices, such as LEDs, Organic Light Emitting Diodes (OLEDs), Liquid Crystal Displays (LCDs), Quantum Dot LEDs (QLEDs), MicroLEDs, Mini-LEDs, or other types. In-cabin displays have evolved significantly over the years, transitioning from basic indicators to sophisticated touchscreens that control a wide range of vehicle functions. Positioning IR illuminators that use a wavelength of IR light that is beyond the perception capabilities of human vision (e.g., 940 nm) should not change the appearance of the visible lighting on a display because the IR light is essentially invisible to human vision. As a result, positioning IR illumination behind a display provides an imperceptible way to add OMS or driver monitoring system (DMS) functionality while maintaining the flow and harmony of design strategies for interior spaces such as a cabin or cockpit of an ego-machine. Furthermore, the large variety of in-cabin displays and their various sizes and locations facilitates the placing of IR illuminators into previously impossible positions with additional aiming angles, which may be used to improve the illumination coverage of the entire scene (e.g., including areas that conventional techniques omit, such as rear seats or footwells being monitored for forgotten items or passengers).

For example, one or more IR illuminator(s) may be integrated and/or embedded into a digital instrument cluster (e.g., a digital instrument cluster positioned behind a steering wheel). Generally, the wider the digital instrument cluster, the more flexibility there is in locating IR emitter(s) and improving illumination coverage (e.g., of the entire cabin, an operator, one or more occupants, etc.). In some embodiments, an IR emitter(s) may be embedded within or otherwise attached to a display panel, circuit board, or other component of a display assembly (e.g., proximate to visible light emitting devices that form a digital instrument, between digital instruments on the digital instrument cluster display, in a backlight assembly, etc.). Examples of possible vehicle displays within which IR illuminator(s) may be integrated include those in dashboard navigation systems, passenger or seatback entertainment systems, infotainment and other console displays, displays built into touchpads or control knobs, door and seat control displays, window control displays, electric vehicle displays, camera displays, digital rearview mirror displays, climate control display, and others.

In some embodiments, IR illuminator(s) may be integrated into one or more lighting fixtures, such as those that provide under dash footwell lighting (e.g., lighting above the brake pedal and/or gas pedal at the driver's seat, lighting under the glove compartment at front passenger seats, rear footwell lighting such as lights under the front seats illuminating the footwell of rear seats, etc.). Some conventional positioning of IR illuminators (e.g., IR illuminators mounted in the steering wheel or in the dashboard) by themselves are often insufficient to illuminate the footwell adequately, making it challenging for a DMS or OMS to detect, recognize, and/or monitor states and activities related to an occupant's or an operator's feet, potentially impeding the ability to detect a hidden child in the footwell when adults are not present in the vehicle. In contrast, mounting IR illuminator(s) in one or more footwell lighting fixtures (e.g., in under-dash footwell lighting fixtures) to illuminate a footwell improves IR footwell illumination over prior techniques. Furthermore, invisible (e.g., 940 nm) IR light should not impact the perception of visible light emanated by visible lighting, so even when the visible lighting is turned off, IR illuminator(s) integrated into the same fixture may operate normally without being perceived.

As such, concealed IR emitters may be used to illuminate the scene. By distributing IR emitters throughout the scene, the resulting IR radiant power may be distributed and controlled electronically to synchronize the IR illuminators and counteract the inverse square falloff of the power and intensity of the IR radiation. As a result, the distribution of IR illuminators facilitates the reduction of power output by any individual IR emitter, leading to better eye safety. Furthermore, individual IR emitters in a distributed system will typically produce less heat than a single, powerful IR illuminator, reducing the risk of thermal-related failures and prolonging the lifespan of each IR illuminator. Moreover, distributing IR emitters throughout the scene facilitates more uniform and effective IR illumination (e.g., within a vehicle cabin) by decentralizing the IR illumination and distributing multiple IR illuminators in various places, such as behind displays, interior lighting, and/or light fixtures (e.g., in a display behind the steering wheel, a rear seat entertainment display, a door control display, a climate control display, a footwell lighting fixture, a ceiling light, etc.).

In some embodiments, the optical sensors (e.g., cameras) and (e.g., IR) illuminator(s) may be synchronized to generate combinations of sensor data (e.g., images) with different illumination patterns. Taking a particular target region being monitored as an example, the optical sensors viewing the target region may be used to generate sensor data (e.g., at a given frame rate), and the illuminators may be alternated or cycled (e.g., at the same frame rate) to generate sets of frames of sensor data from different sensors using different illumination patterns for different frames (e.g., left-facing illuminator, front-facing illuminator, right-facing illuminator, rear-facing illuminator, no illumination). In some embodiments, illuminators may be illuminated in groups (e.g., (e.g., left-facing illuminators, front-facing illuminators, etc.). As such, the illuminator(s) may be cycled and synchronized with the optical sensors to generate sets of frames of sensor data representing multiple views and multiple illumination patterns in substantially the same time slice.

In some embodiments, the intensity of each IR illuminator may be adapted based on an amount of detected light. For example, an increase or decrease in ambient IR light (e.g., the ratio of detected IR to green light intensity) from frame to frame may be detected using one or more ambient sensors positioned in a particular target region and/or using sensor data (e.g., images) representing the target region, and IR illumination for that region may be decreased in response to a detected increase in ambient IR light (or vice versa) independently of IR illumination of other region(s). In some embodiments, ambient sensors and/or images of a target region may be used to generate a spatial map quantifying the detected ambient IR light (e.g., the ratio of detected IR to green light intensity) to estimate the distribution of sunlight across the target region, and any known technique may be used to detect whether the spatial map encodes a gradient in a particular direction. For example, a gradient from the left to the right side of a target region likely indicates that sunlight is impinging from the left and getting weaker by the time it reaches the right side of the region. As such, the intensity of left-facing illuminator(s) may be reduced in response. More generally, the intensity of the illuminators may be adapted to a detected gradient in detected ambient IR light across a target region. As such, ambient light and/or sensor (e.g., camera) feedback may be used to selectively control the intensity of distributed illuminators, thereby optimizing resulting image quality and the corresponding accuracy of downstream tasks (e.g., in each region of the vehicle). Adaptively controlling the intensity of distributed illuminations improves the likelihood that areas that need more illumination will receive it and reduces the risk of over-illumination elsewhere.

In some embodiments, the distributed optical sensors and illuminators may be used to extract reflectance data such as a BRDF or one or more reflectance maps representing a measure of the reflectance of the target region being monitored (e.g., in the cabin), and the extracted reflectance data may be used to support one or more downstream tasks. For example, the BRDF or a set of reflectance maps (e.g., corresponding to each optical sensor) may be used to generate an HDR image of the region being monitored. This HDR image should improve the accuracy of lighting and materials depicted in the image and remove glare over images from individual cameras, so the HDR image may be used to improve downstream tasks. Additionally or alternatively, an extracted BRDF may be used to re-render an image of the region being monitored to provide a more realistic and physically accurate rendering, and the re-rendered image may be used to improve downstream tasks. Generally, the resulting images may be used for a variety of tasks. Continuing with the in-cabin example, supported tasks may include operator or occupant monitoring or detection tasks (e.g., gaze detection, pose detection, attentiveness or fatigue assessment, facial recognition, gesture recognition, occupant presence detection, child presence detection, seat belt detection, hands-on-wheel detection, etc.), generating visualizations (e.g., video conference calls), and/or otherwise.

Additionally or alternatively, the distributed optical sensors and illuminators may be used to reconstruct 3D geometry and/or 3D pose of an occupant, operator, or other object in the environment. For example, stereo vision may be used to generate one or more depth maps from image data generated using different cameras, the depth map(s) may be transformed into a 3D point cloud, and surface reconstruction may be applied to generate a surface mesh from the 3D point cloud. Depending on the monitoring or detection task involved, designated keypoints may be identified from the extracted surface mesh and used in the monitoring or detection task. For example, conventional techniques often struggle in the presence of certain lighting or imaging conditions (e.g., shading, glare, noise) that interfere with relevant features (e.g., facial features for operator attentiveness monitoring, fatigue monitoring, or facial expression detection). As such, in some embodiments, 3D positions of designated facial landmarks may be extracted from an extracted surface mesh, and the 3D positions may be monitored (e.g., to detect or assess operator attentiveness, fatigue, or facial expressions). More generally, a variety of landmarks may be extracted from an extracted surface mesh based on the task (e.g., gesture recognition, limb length estimation, authentication of an operator or occupant, presence detection, etc.), and the landmarks may be evaluated in addition or as an alternative to other types of sensor data to perform any suitable monitoring or detection task.

The techniques described herein result in a variety of benefits. For example, embodiments that use illuminated multi-view sensor data (e.g., images from different perspectives) to extract reflectance data or 3D geometry for one or more downstream tasks reduce and even eliminate the effects of conventional limitations stemming from glare (e.g., specular reflections), occlusions, illumination dependencies, dynamic range, and noise, and increase the sensitivity and accuracy of object detection and monitoring tasks. Taking OMS or DMS as an example, reconstructing the interior of the cabin with more accuracy enables improved downstream feature detection and sensing. More generally, extracted reflectance data may be used to compute true RGB values, which may be used to improve the color of generated images. Furthermore, images from different perspectives may be combined to generate images with improved SNR and/or with reduced saturation in relatively darker areas. In embodiments that use different illuminators to illuminate a region observed by multiple optical sensors, the corresponding sensor data (e.g., images) should represent specular highlights in different positions in the different frames of sensor data. As a result of this translation of specular highlights, it is possible to recover areas that would otherwise be occluded by the specular highlights in any single frame.

Furthermore, embodiments that position an IR illuminator behind a display (e.g., an existing in-cabin display) and/or behind the enclosure of visible interior and/or auxiliary lighting provide an imperceptible way to add monitoring or sensing functionality, consistent with current design trends that favor simplicity and minimalism. Embodiments that distribute an IR illuminator and corresponding optical sensor away from one another reduce the risk of illuminating the retina of human eyes, addressing conventional issues with bright or low contrast pupils. Furthermore, distributing IR illuminators (e.g., within the cabin) provides more uniform illumination that improves image quality as well as inference accuracy and confidence of downstream machine learning models, and reduces the power that would otherwise be needed from any individual illuminator, reducing the risk to eye safety. Moreover, embedding or otherwise integrating IR illuminator(s) into footwell lighting fixtures facilitates improved detection accuracy in footwells, such as rear vehicle footwells where child detection tasks often focus their monitoring efforts. Distributing illumination within the cabin provides more a consistent illumination that is beneficial for applications such as those involving hemispherical cameras and/or gesture recognition (e.g., improving the illumination of hands in back seats, which should improve gesture recognition for all passengers).

Furthermore, ego-machines that have three or more rows of seating often have a complex spatial arrangement and a large volume to illuminate. The presence of multiple rows and occasionally tinted windows makes it challenging to maintain uniform illumination across all the spaces, especially for back seating. Items such as headrests, pillars, passengers, and other onboard objects can create shadow zones, leading to blind spots in monitoring. As such, multiple IR emitters may be distributed throughout the ego-machine to improve the uniformity of illumination in such situations. The use of distributed IR light sources may be used to reduce shadowing effects, which is not possible with a single IR illuminator. Furthermore, adaptively controlling the intensity of distributed IR illuminators (e.g., based on ambient light and/or camera feedback) serves to optimize image quality and the accuracy of downstream tasks within each region (e.g., of the vehicle). Some embodiments may selectively image different regions by turning off illuminator(s) of designated region(s) to increase privacy. Moreover, distributing IR illuminators provides a more robust and fault-tolerant illumination scheme than using a single IR illuminator because if one IR emitter fails or malfunctions, other IR emitters may be used as a backup, mitigating against the risk of a complete blackout in visibility. This built-in redundancy improves the likelihood that a surveillance or monitoring system will remain functional even when facing hardware issues. Finally, individual IR emitters in a distributed system will typically produce less heat than a single, powerful IR illuminator, reducing the risk of thermal-related failures and prolonging the lifespan of each IR illuminator.

As such, the techniques described herein may be used to generate illuminated multi-view RGB and IR images or videos and/or perform one or more detection tasks using such images or videos. Using the techniques described herein, the reflectance of monitored subjects or other objects may be detected and used to generate more accurate sensor data (e.g., images) with sharper detail than prior techniques, and/or 3D geometry of the objects may be reconstructed, and the resulting data may be used to improve the accuracy of downstream detection tasks over prior techniques.

With reference to FIG. 1, FIG. 1 is an example multi-view sensing pipeline 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionalities to those of example autonomous vehicle 700 of FIGS. 7A-7D, example computing device 800 of FIG. 8, and/or example data center 900 of FIG. 9.

In the embodiment illustrated in FIG. 1, the multi-view sensing pipeline 100 includes a control component 110 that controls and/or synchronizes a set of optical sensors 150 and emitters 160, which may be distributed in an environment such as an interior space (e.g., a cabin or cockpit of an ego-machine, such as the autonomous vehicle 700 of FIGS. 7A-7D). In some embodiments, a reflectance extraction component 170 uses the resulting sensor data 155 (e.g., sets of images from different perspectives and with different illumination patterns) to extract reflectance data such as a bidirectional reflectance distribution function (BRDF) or one or more reflectance maps representing the reflectance of one or more surfaces in the environment (e.g., surfaces of occupants or other monitored subjects, surfaces of the interior space, etc.), an image data generation component 175 may use the reflectance data to generate image data (e.g., HDR images, re-rendered images, etc.), and the generated image data may be used in one or more downstream tasks 190. Additionally or alternatively, a 3D reconstruction component 180 may use the sensor data 155 to reconstruct the 3D geometry of one or more surfaces in the environment (e.g., surfaces of occupants or other monitored subjects, surfaces of the interior space, etc.), a shape extraction component 185 may extract a 3D pose, landmarks, or some other representation of the shape of the reconstructed surface(s), and the extracted shape may be used in one or more downstream tasks 190.

The optical sensors 150 may include any number and type of optical sensor, such as one or more RGB sensors, IR sensors, depth sensors, or cameras (e.g., RGB camera, IR camera, RGB/IR camera, thermal camera, etc.), and the optical sensors 150 may be positioned and/or oriented in various ways in an environment depending on the application (e.g., the sensing and/or detection task) and/or the embodiment. In an example involving a sensing system in an interior space (e.g., a vehicle DMS or OMS), the optical sensors 150 may be positioned to view one or more target regions within the cabin, cockpit, or other interior space from different viewing angles and corresponding overlapping fields of view such that target regions of interest are observed from multiple perspectives. Taking an in-cabin or cockpit sensing system as an example, any number of target regions may be monitored, such as the driver's seat, a passenger seat, combinations (e.g., rows) of seating, footwells, aisles, storage compartments, entries or exits, adjoining regions (e.g., boarding platforms, platforms between train cars), etc. In some embodiments, the optical sensors 150 may be positioned within a steering column (e.g., facing the driver), in a mirror (e.g., a camera in the rear review mirror facing the driver or the cabin), in an infotainment console (e.g., facing the driver or the cabin), in a vehicle pillar (e.g., facing a particular row of seating), above a row of headrests (e.g., facing forward for child detection), and/or other locations. These are just a few examples of possible sensor layouts, and other sensor layouts within any suitable interior space (e.g., supermarket aisle, hospital operating room, retail store, office space, manufacturing facility, etc.) or exterior space (e.g., city street, construction site, agricultural field, public transportation hub, urban environment, etc.) may be implemented within the scope of the present disclosure.

The emitters 160 may include any number and type of light source, whether in the visible spectrum, infrared spectrum, or otherwise, and the emitters 160 may be positioned and/or oriented in various ways in the environment depending on the application (e.g., the sensing and/or detection task) and/or the embodiment. In some embodiments, any number of emitters may be positioned and/or oriented to illuminate any number of target regions being monitored with the optical sensors 150. In some embodiments, multiple emitters may be used to illuminate any given target region from different directions to reduce shadows and ensure surfaces are well-lit. In some implementations, the emitters 160 include one or more IR emitters that illuminate one or more target regions monitored by one or more of the optical sensors 150 that are sensitive to IR light (e.g., IR sensors, IR cameras, RGB/IR cameras). Generally, the optical sensors 150 and/or the emitters 160 may be positioned or oriented to avoid direct glare into any of the optical sensors 150; may be positioned at varying heights; may implement cross-lighting, angular offsets, or triangulated lighting; may be positioned or oriented with some oblique viewing angle (e.g., between 30 and 60 degrees) relative to a target surface being monitored, and/or otherwise.

In some embodiments, one or more of the emitters 160 may be integrated behind one or more displays, devices, instruments, light fixtures, or other apparatus with a covering composed using some material(s) that is transmissive to light (e.g., plastic, glass, crystalline solid). For example, one or more IR (e.g., LED and VSCEL) emitters may be integrated behind one or more displays, devices, instruments, light fixtures, or other apparatus with an IR transmissive covering, such one composed using plastic(s) (e.g., polyethylene, polytetrafluoroethylene, polypropylene, etc.), crystalline solid(s) (e.g., germanium or silicon), IR transmissive glass(es) (e.g., chalcogenide), etc. For example, the emitters 160 may include one or more IR emitters incorporated into a display assembly (e.g., on a display panel, circuit board, or backlight assembly), a digital instrument cluster, in lighting fixtures, and/or other light emitting assemblies. Taking an in-cabin or cockpit sensing system as an example, possible displays within which the emitters 160 may be integrated include those in dashboard navigation systems, passenger or seatback entertainment systems, infotainment and other console displays, displays built into touchpads or control knobs, door and seat control displays, window control displays, electric vehicle displays, camera displays, digital rearview mirror displays, climate control display, and/or others. Additionally or alternatively, the emitters 160 may be integrated into one or more lighting fixtures, such as roof mounted light fixtures, fixtures that provide under dash footwell lighting (e.g., lighting above the brake pedal and/or gas pedal at the driver's seat, lighting under the glove compartment at front passenger seats, rear footwell lighting such as lights under the front seats illuminating the footwell of rear seats, etc.), and/or otherwise. As such, the emitters 160 may be positioned, optionally concealed, and used to illuminate the space being monitored.

In some embodiments, the optical sensors 150 and the emitters 160 may be controlled and/or synchronized by a control component 110 to generate frames of sensor data 155 (e.g., images) illuminated with different illumination patterns by the emitters 160. For example, the optical sensors 150 and/or the emitters 160 may be connected using wires, wireless communication (e.g., Bluetooth or Wi-Fi), and/or one or more slave mechanisms (e.g., sensors, relays, or other modules) that respond to commands or signals from the control component 110, a synchronization component 120 of the control component 110 may activate the emitters 160 and/or the optical sensors 150, and an intensity control component 130 of the control component 110 may adjust the intensity of (e.g., IR) light output by the emitters 160. In an example involving in-cabin sensing, the control component 110 may be implemented as part of an Engine Control Unit (ECU) or Central Control Unit (CCU) that manages or regulates an ego-machine's electronic systems, engine performance, fuel efficiency, emissions, and/or other operations. Note that this implementation is meant simply as an example, and other variations may be implemented. For example, the control component 110 (or some other component) may control any given emitter using a single control signal (e.g., a pulse width modulation (PWM) signal) to manage both the ON/OFF state and the intensity of the emitter, or the control component 110 may use distinct signals, one (e.g., a digital signal) to control the ON/OFF state and another (e.g., an analog or PWM) to adjust the intensity. Furthermore, the control component 110 (or some other component) may use any number of control signals to trigger any given optical sensor to acquire a frame of sensor data 155. For example, the optical sensor may support the use of an external digital signal and/or a software command sent via the sensor's interface (e.g., USB, Ethernet) to acquisition of sensor data, a signal or setting that controls the exposure time, a signal to synchronize the start of a new frame capture across multiple optical sensors, and/or otherwise.

In the example illustrated in FIG. 1, for any given target region being monitored, the synchronization component 120 may trigger the optical sensors 150 viewing the target region to generate a corresponding frame of sensor data 155 (e.g., at a designated frame rate, synchronized start times), and the synchronization component 120 may alternate or cycle the emitters 160 illuminating the target region (e.g., at the same frame rate, synchronized with the optical sensors 150) to generate successive sets of frames of sensor data 155 from different optical sensors 150 using different illumination patterns for different frames. Taking an example in which four IR emitters are used to illuminate a particular target region such as the driver's seat (e.g., one left-facing emitter illuminating the right side of the driver, one driver-facing emitter illuminating the front of the driver, one downward-facing emitter pointing downward towards the driver's forehead, and one upward-facing emitter pointing upwards towards the driver's chin), the synchronization component 120 may alternate or cycle the emitters 160 so they each individually illuminate a successive frame (e.g., left-facing emitter, front-facing emitter, downward-facing emitter, upward-facing emitter, no emitter), and each optical sensor 150 viewing the target region may be used to generate a corresponding frame(s) of sensor data 155 representing the target region during each stage of the cycle. In some embodiments, some or all of the emitters 160 may be cycled in groups (e.g., left-facing and downward-facing emitters, right-facing and upward facing emitters, no emitter, etc.), and each optical sensor 150 viewing the target region may be used to generate a corresponding frame(s) of sensor data 155 representing the target region during each stage of the cycle. Note that for some sensors such as RGB/IR cameras, each frame of sensor data may effectively represent multiple observations (e.g., an RGB image containing the combined data from the red, green, and blue channels; and an IR image such as a greyscale image that represents the intensity of IR light). These are meant simply as examples, and other variations may be implemented within the scope of the present disclosure.

Figure 2:
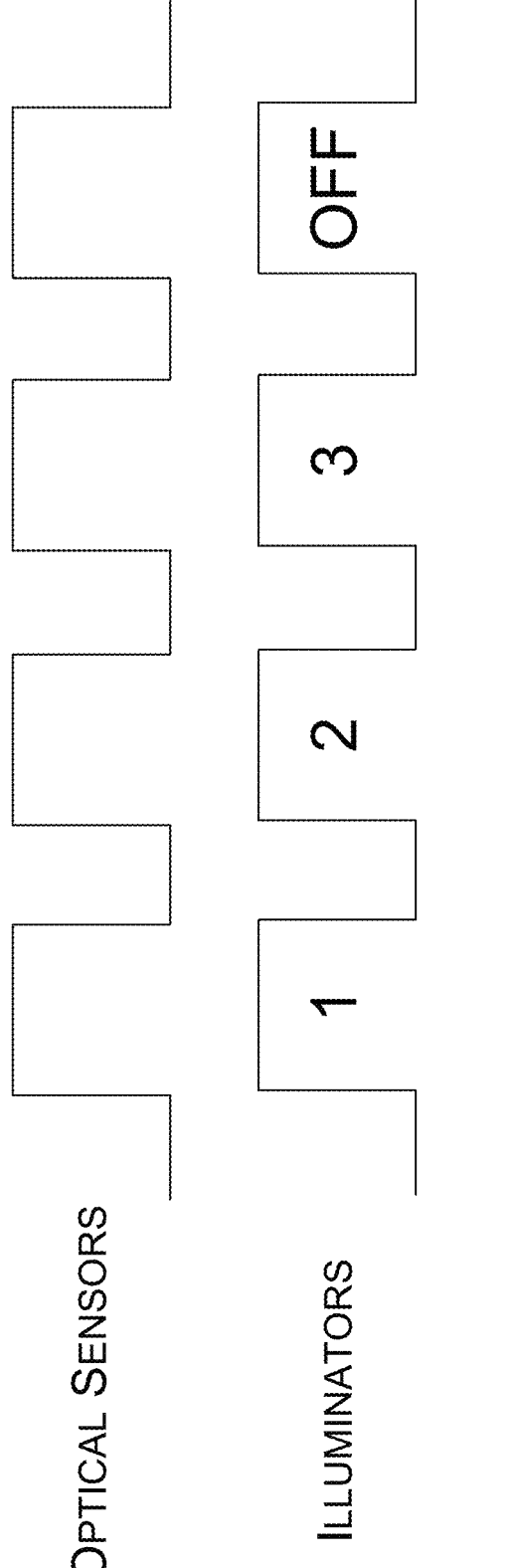
FIG. 2 illustrates an example timeline for synchronizing optical sensors and illuminators, in accordance with some embodiments of the present disclosure.

As such, the synchronization component 120 may cycle and synchronize the emitters 160 with the optical sensors 150 to generate sets of frames of sensor data 155 representing multiple views of the same target region and multiple illumination patterns in what may be assumed to be substantially the same time slice. FIG. 2 illustrates an example timeline for synchronizing optical sensors and illuminators at a designated frame rate or interval, in accordance with some embodiments of the present disclosure.

In some embodiments, the intensity control component 130 may adapt the intensity of one or more of the emitters 160 (e.g., each emitter) based on a detected increase or decrease in an amount of detected light intensity (e.g., detected using one or more ambient light sensors 140, detected based on a measure of detected light intensity from a previous frame). For example, the ambient light sensor(s) 140 may be positioned in a particular target region, and the intensity control component 130 may use the ambient light sensor(s) 140 to detect and track a measure of light intensity (in one or more spectral bands or color channels) from frame to frame (e.g., the ratio of detected IR to green light intensity). Additionally or alternatively, the multi-view sensing pipeline 100 (or a portion thereof) may operate at a designated frame rate (e.g., 30 frames per second (fps)), and the intensity control component 130 may periodically analyze frames of sensor data 155 representing the target region to determine and track the measure of detected light intensity in that frame. As such, the intensity control component 130 may determine whether the measure of detected light intensity increases or decreases over any given interval, and if so, the intensity control component 130 may determine whether and how to adjust the intensity of the emitters 160 illuminating the target region and apply a corresponding control signal prior to the corresponding optical sensors 150 generating a subsequent frame.

In some embodiments, the intensity control component 130 may compute or otherwise determine the measure of detected light intensity from a given frame of sensor data 155 in various ways. By way of non-limiting example, each pixel sensor (e.g., per color channel) may output a value (e.g., in digital units) that is proportional to the product of the intensity of light incident on the pixel sensor, the exposure time, and the sensor gain, so the intensity control component 130 may divide the output of any given pixel sensor by the known exposure time and sensor gain for that pixel sensor to compute a measure of intensity for each pixel. As such, the intensity control component 130 may compute an average intensity of one or more pixels in one or more color channels in each frame.

In some embodiments, the intensity control component 130 computes average intensity using a histogram of values. For example, the intensity control component 130 may compute a histogram representing counts of pixels that have particular (e.g., digital unit or intensity) values or ranges of values (e.g., in each of one or more color channels). The intensity control component 130 may bin the values and count the number of pixels in each bin (e.g., in each channel). Depending on the embodiment, digital unit values may be binned and converted to intensity values, and/or digital unit values may be converted to intensity values and then binned. As such, the intensity control component 130 may compute average intensity (e.g., in each of one or more color channels) using a weighted average of the intensity values weighted by the count of pixels for each bin.

In some embodiments, the intensity control component 130 may bin, average, and/or otherwise account for only those pixels in a designated region of interest. Taking an example embodiment in which one of the optical sensors 150 is positioned to view an interior of a cabin with windows, where the monitoring target is (e.g., an operator or occupant) inside the cabin, a portion of the field of view of the optical sensor may not be of interest (e.g., pixels representing the region outside the cabin through the windows). As such, a region of interest formed by some subset of the pixels in each frame may be designated. For example, one or more shapes (e.g., an ellipse, a rectangle, an intersection of multiple shapes, any geometric primitive, etc.) may be positioned in the frame (e.g., centered on a region in which an operator or occupant's face and/or body is expected to be positioned), where the shape(s) and/or positioning may be fixed or dynamic (e.g., a detected mask or bounding box predicted to contain a monitoring target, such as a detected face or detected person). As such, the intensity control component 130 may bin, average, and/or otherwise account for only those pixels in a designated region of each frame when determining the measure of detected light intensity.

In some embodiments, the intensity control component 130 may discard or ignore (e.g., highlight and/or lowlight) pixels with intensity values that exceed some (e.g., statistical) threshold. For example, the tails of the histogram may represent outliers in intensity values, so the intensity control component 130 may discard or ignore some top and/or bottom percentile (e.g., 5 or 10%) of the intensity values from the average, effectively discarding or ignoring the histogram tails, which should reduce the risk of the tails disproportionately impacting the average.

As such, the intensity control component 130 may compute or otherwise determine average intensity values (e.g., in a specified region of interest) in each of one or more color channels (e.g., average intensity values of green G ($G_{avg}$) and IR ($I_{avg}$) channels). Note that some embodiments described herein use the average intensity in the green channel since the green channel is typically wider than red and blue channels, and may therefore capture more ambient light and may more accurately represent intensity of the ambient light in certain scenarios (e.g., in the presence of red or blue light) than with the use of red or blue channels. However, this need not be the case, and some embodiments may average intensity in any desired channel(s) of light (e.g., red/blue/green, red/yellow/blue, cyan/yellow/magenta, cyan/yellow/green/magenta, etc.) and/or combination of channels (e.g., a weighted average across multiple channels).

As such, the intensity control component 130 may track a measure of detected light intensity in one or more target regions in the space being monitored, compute changes in measure of detected light intensity over time (e.g., periodically, at a designated frame rate, every one or more cycles of the emitters 160, etc.), and adapt the intensity of the emitters 160 in response to a detected change (e.g., above a designated threshold). As a general matter, if the detected light intensity in a particular target region increases, the intensity control component 130 may decrease the intensity of light output by one or more of the emitters 160 illuminating that region, and/or vice versa. In some embodiments, the intensity control component 130 may track a measure of detected light intensity in each of a plurality of target regions, and may independently control the intensity of light output by the emitters 160 illuminating each region based on the detected light intensity in that region.

In some embodiments, the intensity control component 130 may use the measure of detected light intensity to generate a spatial map that represents an estimated distribution of detected light intensity across a particular target region. For example, the intensity control component 130 may take readings from multiple ambient light sensor(s) 140 distributed across a target region, and/or may spatially arrange the readings using any suitable (e.g., one-dimensional or two-dimensional) data structure. Additionally or alternatively, the intensity control component 130 may compute or otherwise determine a measure of detected light intensity from frames of sensor data 155, and may spatially arrange the resulting values using any suitable data structure, such as a grayscale or intensity image where each pixel represents a single intensity value. As such, the intensity control component 130 may use any known gradient detection technique to detect the presence and direction of a gradient in the spatial arrangement of the measure of detected light intensity. Taking a simple example in which a few ambient light sensors 140 are used to take readings from different parts in a target region, the readings from consecutive regions may be subtracted from one other to estimate a gradient. More generally, whether the spatial distribution is represented in one-dimension, two-dimensions, or otherwise, any known gradient detection technique or gradient operator may be used to identify changes in detected light intensity and estimate the direction of those changes.

As such, if the intensity control component 130 detects a gradient of light intensity across a target region, the intensity control component 130 may compensate for the gradient using the emitters 160 illuminating that region. For example, a gradient from the left to the right side of a target region likely indicates that sunlight is impinging from the left and getting weaker by the time it reaches the right side of the region. As such, the intensity control component 130 may compensate for the detected gradient by reducing the intensity of left-facing emitter(s) in response. Generally, the intensity control component 130 may apply one or more thresholds to the magnitude and/or direction of the detected gradient to determine whether to adapt the intensity of any emitters, and if so, which ones. Accordingly, the intensity control component 130 may use the ambient light sensor(s) 140 and/or frames of sensor data 155 generated by the optical sensors 150 to detect an amount of light intensity in a target region being monitored and selectively control the intensity of the emitters 160 illuminating that region in response, thereby optimizing resulting image quality and the corresponding accuracy of the task(s) 190 that use that data. These are meant simply as examples, and other variations may be implemented within the scope of the present disclosure.

As such, the control component 110 may use the optical sensors 150 (and the emitters 160) to generate sets of frames of sensor data 155 representing multiple views of each target region (and multiple illumination patterns) at a designated frame rate. By way of nonlimiting example, running a set of the optical sensors 150 viewing a particular target region at a frame rate such as 120 fps while cycling the emitters 160 through some number of emitter states such as four would generate sets of frames representing the different illumination patterns produced by the different emitter states at 30 fps. As such, each set of frames may include one or more frames of sensor data 155 (e.g., an RGB and/or an IR image) generated by each of the optical sensors 150 for each of the illumination patterns. As such, the reflectance extraction component 170 and/or the 3D reconstruction component 180 may use the sets of frames of sensor data 155 to support one or more downstream task(s) 190. The frame rates of task(s) 190 that rely on extracted reflectance, task(s) 190 that rely on 3D reconstruction, and/or task(s) 190 that monitor different target regions may be synchronized and/or independent of one another. Generally, the frame rate of the sets of sensor data 155 generated for any given target region may be tailored to match the requirements of downstream task(s) 190. For example, relatively higher frame rates (e.g., 60-120 fps) may be used for task(s) 190 that benefit from a more detailed motion analysis such as driver fatigue detection, and/or relatively lower frame rates (e.g., 10-30 fps) may be used for other task(s) 190 that may not require as high of a frame rate such as occupant presence monitoring.

In some embodiments, the reflectance extraction component 170 uses the sets of frames of sensor data 155 (e.g., sets of images from different perspectives and with different illumination patterns) to extract reflectance data such as a BRDF or one or more reflectance maps representing the reflectance of one or more surfaces in the environment (e.g., surfaces of occupants or other monitored subjects, surfaces of the interior space, etc.), the image data generation component 175 may use the reflectance data to generate image data (e.g., HDR images, re-rendered images, etc.), and the generated image data may be used in one or more downstream tasks 190.

Generally, the reflectance extraction component 170 may use any known technique to extract reflectance data using a set of frames of sensor data 155 representing different views of a target region. For example, the optical sensors 150 viewing a particular target region from different perspectives may be assigned different (e.g., band-stop) filters that block different wavelengths of light such that the combined set of passed frequencies covers a designated spectral range of interest (e.g., with minimal overlap). For example, if a target spectral range is from 400 to 700 nanometers (nm), filters may be assigned in intervals that collectively span this range (e.g., 400-450 nm, 450-500 nm, etc.). As such, the distribution of filters for the optical sensors 150 may be used to generate sets of frames of sensor data 155 that collectively represent the designated spectral range in the presence of different illumination patterns, and the reflectance extraction component 170 may use any known technique to extract reflectance data (e.g., a BRDF, one or more reflectance maps) from one or more of the sets of frames of sensor data 155 representing the target region.

For example, a BRDF may be used to represent how light is reflected from a surface as a function of four variables: the wavelength of incident light, the angle of incident light, the wavelength of reflected light, and the angle of reflected light. In some embodiments, an estimated BRDF may encode any number of buckets in a designated range of values for each variable on a per-voxel basis. By way of nonlimiting example, a designated range of incident and reflected angles (e.g., 180 degrees) may be divided into some number of buckets (e.g., four buckets each), the wavelength of incident light may be divided into some number of buckets (e.g., 30), and the wavelength of reflected light may be divided into some number of buckets (e.g., one bucket representing the same reflected wavelength as the incident wavelength, ignoring output wavelengths that do not equal the input wavelength). As such, each voxel may store some number of values (e.g., 4×30×4×1=480 concatenated values) representing estimated values in designate buckets in designated ranges of the four variables. Accordingly, the reflectance extraction component 170 may extract any suitable representation of a BRDF encoding the reflectance of a target region using any known technique (e.g., photometric stereo, reflectance transformation imaging (RTI), neural network approaches, etc.).

Continuing with this example, the image data generation component 175 may use any known technique to re-render image data representing the target region being monitored using the BRDF to provide a more realistic and physically accurate rendering, and may provide the re-rendered image data to one or more downstream task(s) 190. Taking image data as an example, for each pixel, the image data generation component 175 may trace rays from the camera through a 3D model of the environment (e.g., a predetermined 3D model, a 3D model generated by the 3D reconstruction component 180) to determine the points of intersection on surfaces, use the extracted BRDF to evaluate the light reflection at each intersection point, sum the contributions of light from all relevant light sources for each pixel, compute the color of each pixel by combining the accumulated light with surface color properties, and assemble the computed pixel colors into a re-rendered image. The image data generation component 175 may use an analogous process to render a thermal image (e.g., adjusting the thermal radiation at each intersection point based on a known or estimated emissivity of the corresponding material). These are meant simply as examples, and other variations may be implemented within the scope of the present disclosure.

In some embodiments, the reflectance extraction component 170 may extract one or more reflectance maps representing the reflectance of a target region from the frames of sensor data 155 using any known technique (e.g., photometric stereo, reflectance transformation imaging (RTI), neural network approaches, etc.). Generally, a reflectance map may represent the reflectance of a target region as it appears from a particular viewpoint and lighting setup (e.g., using one or more reflectance values per pixel). In some such embodiments, the image data generation component 175 may use an extracted reflectance map to render, re-render, or refine the accuracy of image data using any known technique (e.g., using rasterization to apply reflectance values from a reflectance map to surfaces as they are rasterized, tracing rays to determine surface intersections and using reflectance map values to compute final pixel colors, applying new lighting conditions using a reflectance map, etc.).

As such, the generated image data (e.g., a re-rendered image) may be used in one or more downstream task(s) 190. Taking in-cabin sensing as an example, the task(s) 190 may include any known operator or occupant monitoring or detection task (e.g., gaze detection, pose detection, attentiveness or fatigue assessment, facial recognition, gesture recognition, occupant presence detection, child presence detection, seat belt detection, hands-on-wheel detection, etc.), generating visualizations (e.g., video conference calls), and/or otherwise.

In some embodiments, the 3D reconstruction component 180 may use the sensor data 155 to reconstruct the 3D geometry of one or more surfaces in the environment (e.g., surfaces of occupants or other monitored subjects, surfaces of the interior space, etc.), the shape extraction component 185 may extract a 3D pose, landmarks, or some other representation of the shape of the reconstructed surface(s), and the extracted shape may be used in one or more downstream tasks 190.

For example, the 3D reconstruction component 180 may generate one or more depth maps (e.g., one for each optical sensor or pair of optical sensors 150, one for each target region) from the frames of sensor data 155 representing each target region (e.g., in substantially the same time slice) using any known technique (e.g., using stereo vision to calculate depth by finding disparities between corresponding points using stereo matching algorithms such as block matching or semi-global matching, using structure-from-motion to reconstruct the 3D scene from multiple viewpoints by estimating camera positions and matching features across images, using a neural network to predict depth from one or more images, etc.). The 3D reconstruction component 180 may convert the depth map(s) into a point cloud representing the target region using the intrinsic parameters of a corresponding optical sensor 150 (and the extrinsic parameters of corresponding optical sensors 150 when aligning multiple depth maps). In some embodiments (e.g., those that convert depth maps from multiple optical sensors 150 into a unified point cloud), the 3D reconstruction component 180 may use any known point cloud registration technique (e.g., iterative closest point, a neural network such as an occupancy network that learns implicit representations of 3D shapes and generates high-resolution 3D models from point clouds, etc.) to merge the point clouds into a single 3D model. As such, the 3D reconstruction component 180 may use any known surface reconstruction technique (e.g., Poisson surface reconstruction, Delaunay triangulation, etc.) to reconstruct a detected surface in the target region from the 3D point cloud model. In some embodiments, resulting 3D representation of the detected surface (e.g., a 3D mesh) may be refined using techniques such as photometric refinement (e.g., integrating photometric data such as color and textures from corresponding images and optimizing vertex positions to reduce discrepancies between the mesh and the photometric data), geometric refinement (e.g., optimizing vertex positions to reduce discrepancies between different instances of the mesh generated using different optical sensors 150), smoothing, etc. As such, the 3D reconstruction component 180 may extract a 3D representation of detected surface(s) in the target region.

Accordingly, the detected surface(s) in the target region may be used to support one or more downstream task(s) 190. Generally, the shape extraction component 185 may use any known technique to detect keypoints (e.g., facial or other human landmarks), a 3D pose, or some other representation of the 3D shape of a monitoring target from a detected 3D surface (e.g., mesh). For example, the shape extraction component 185 may detect keypoints using mesh convolutional networks (MeshCNN) or graph convolutional networks (GCNs), detect a 3D pose using techniques like optimization-based methods involving inverse kinematics and energy minimization, and/or otherwise. Taking keypoint detection from a 3D surface (e.g., mesh) as an example, depending on the monitoring or detection task involved, the shape extraction component 185 may identify one or more designated keypoints (e.g., facial or other human landmarks) from the detected surface(s) using any known technique (e.g., using feature detection techniques such those that use neural networks to detect the locations of target keypoints in the surface), encode a representation of the keypoints (e.g., stacked or concatenated keypoint coordinates), and apply the representation to a corresponding task 190 (e.g., implemented by a corresponding neural network).

For example, the task(s) 190 may include driver and/or occupant monitoring tasks that may significantly benefit from knowing the locations of keypoints such as the positions of eyes, nose, mouth, and/or joints. For driver monitoring, task(s) 190 such as driver attentiveness detection may use keypoints to assess attentiveness by tracking the position and movement of the eyes and head and determining whether the driver is looking at the road, checking mirrors, or distracted by other activities such as using a phone. Additionally or alternatively, task(s) 190 such as drowsiness or fatigue detection may use keypoints to monitor the driver's head tilt and posture to detect signs of drowsiness or fatigue. In the context of occupant monitoring, the task(s) 190 may use keypoints to identify and analyze the position and behavior of passengers (e.g., detecting proper and improper seating posture, particularly for child passengers), and/or to detect whether seatbelts are being properly worn. In some embodiments, the task(s) 190 may use keypoints to assess the position and size of occupants to optimize airbag inflation for safety. More generally, the shape extraction component 185 may extract any number and type of keypoints (e.g., landmarks) from a detected 3D surface (e.g., an extracted surface mesh) to support various downstream task(s) 190 (e.g., gesture recognition, limb length estimation, authentication of an operator or occupant, presence detection, etc.), and the corresponding task(s) 190 may evaluate a representation of the extracted keypoints in addition or as an alternative to other types of sensor data to perform any suitable monitoring or detection task.

Now referring to FIGS. 3-6, each block of the methods 300-600, described herein, comprises a computing process that may be performed using any combination of hardware, firmware, and/or software. For instance, various functions may be carried out by a processor executing instructions stored in memory. The methods 300-600 may also be embodied as computer-usable instructions stored on computer storage media. The methods 300-600 may be provided by a standalone application, a service or hosted service (standalone or in combination with another hosted service), or a plug-in to another product, to name a few. In addition, the methods 300-600 are described, by way of example, with respect to the multi-view sensing pipeline 100 of FIG. 1. However, these methods may additionally or alternatively be executed by any one system, or any combination of systems, including, but not limited to, those described herein.

Figure 3:
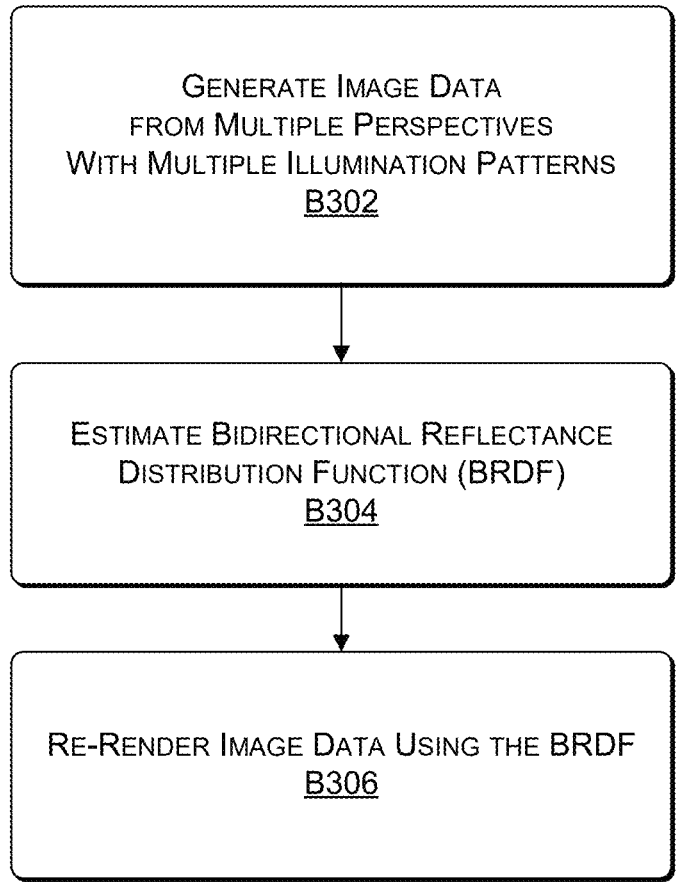
FIG. 3 is a flow diagram showing a method for rendering image data using an estimated bidirectional reflectance distribution function, in accordance with some embodiments of the present disclosure.

FIG. 3 is a flow diagram showing a method 300 for rendering image data using an estimated bidirectional reflectance distribution function, in accordance with some embodiments of the present disclosure. The method 300, at block B302, includes generating image data from multiple perspectives with multiple illumination patterns. For example, with respect to the multi-view sensing pipeline 100 of FIG. 1, the synchronization component 120 may cycle and synchronize the emitters 160 with the optical sensors 150 to generate sets of frames of sensor data 155 representing multiple views of the same target region and multiple illumination patterns in what may be assumed to be substantially the same time slice. For example, each set of frames may include one or more frames of sensor data 155 (e.g., an RGB and/or an IR image) generated by each of the optical sensors 150 for each of the illumination patterns.

The method 300, at block B304, includes estimating a bidirectional reflectance distribution function (BRDF) from the image data. For example, with respect to the multi-view sensing pipeline 100 of FIG. 1, the reflectance extraction component 170 may extract any suitable representation of a BRDF encoding the reflectance of a target region from one or more of the sets of frames of sensor data 155 representing a target region using any known technique (e.g., photometric stereo, reflectance transformation imaging (RTI), neural network approaches, etc.).

The method 300, at block B306, includes re-rendering image data using the bidirectional reflectance distribution function. For example, with respect to the multi-view sensing pipeline 100 of FIG. 1, the image data generation component 175 may use any known technique to re-render image data representing the target region being monitored using the BRDF to provide a more realistic and physically accurate rendering.

Figure 4:
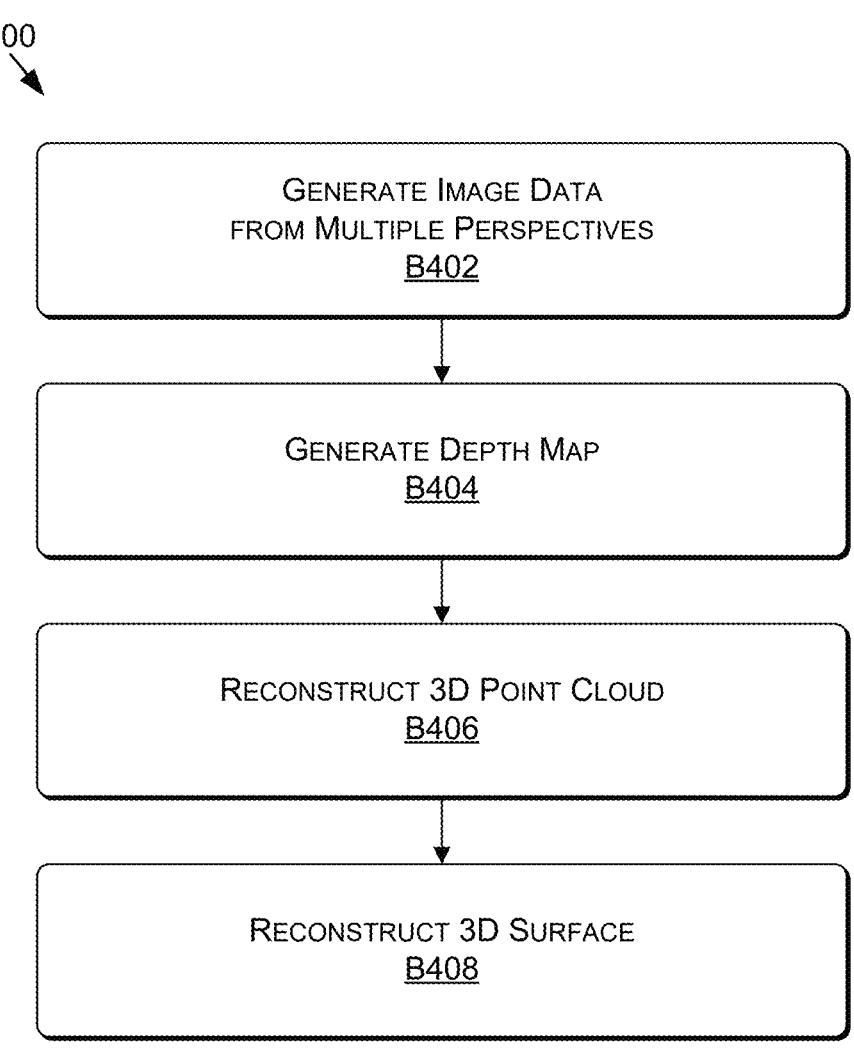
FIG. 4 is a flow diagram showing a method for reconstructing a 3D surface based on image data from multiple perspectives, in accordance with some embodiments of the present disclosure.

FIG. 4 is a flow diagram showing a method 400 for reconstructing a 3D surface based on image data from multiple perspectives, in accordance with some embodiments of the present disclosure. The method 400, at block B402, includes generating image data from multiple perspectives. For example, with respect to the multi-view sensing pipeline 100 of FIG. 1, the synchronization component 120 may trigger the optical sensors 150 viewing the target region to generate a corresponding frame of sensor data 155 (e.g., at a designated frame rate, synchronized start times). In some embodiments, the synchronization component 120 may alternate or cycle the emitters 160 illuminating the target region (e.g., at the same frame rate, synchronized with the optical sensors 150) to generate successive sets of frames of sensor data 155 from different optical sensors 150 using different illumination patterns for different frames.

The method 400, at block B404, includes generating a depth map from the image data. For example, with respect to the multi-view sensing pipeline 100 of FIG. 1, the 3D reconstruction component 180 may generate one or more depth maps (e.g., one for each optical sensor or pair of optical sensors 150, one for each target region) from the frames of sensor data 155 representing each target region (e.g., in substantially the same time slice) using any known technique (e.g., using stereo vision to calculate depth by finding disparities between corresponding points using stereo matching algorithms such as block matching or semi-global matching, using structure-from-motion to reconstruct the 3D scene from multiple viewpoints by estimating camera positions and matching features across images, using a neural network to predict depth from one or more images, etc.).

The method 400, at block B406, includes reconstructing a 3D point cloud from the depth map. For example, with respect to the multi-view sensing pipeline 100 of FIG. 1, the 3D reconstruction component 180 may convert one or more depth maps into a point cloud representing the target region using the intrinsic parameters of a corresponding optical sensor 150 (and the extrinsic parameters of corresponding optical sensors 150 when aligning multiple depth maps).

The method 400, at block B408, includes reconstructing a 3D surface from the point cloud. For example, with respect to the multi-view sensing pipeline 100 of FIG. 1, the 3D reconstruction component 180 may use any known surface reconstruction technique (e.g., Poisson surface reconstruction, Delaunay triangulation, etc.) to reconstruct a detected surface in the target region from the 3D point cloud model.

FIG. 5 is a flow diagram showing a method 500 for executing one or more operations of an ego-machine based at least on reflectance data encoding one or more reflectance values representative of at least a portion of the interior space of the ego-machine, in accordance with some embodiments of the present disclosure. The method 500, at block B502, includes generating, using a plurality of optical sensors synchronized with light emitters distributed within an interior space of an ego-machine, image data representing at least a portion of the interior space. For example, with respect to the multi-view sensing pipeline 100 of FIG. 1, the synchronization component 120 may cycle and synchronize the emitters 160 with the optical sensors 150 to generate sets of frames of sensor data 155 representing multiple views of the same target region and multiple illumination patterns in what may be assumed to be substantially the same time slice. For example, each set of frames may include one or more frames of sensor data 155 (e.g., an RGB and/or an IR image) generated by each of the optical sensors 150 for each of the illumination patterns.

The method 500, at block B504, includes extracting, based at least on the image data, reflectance data encoding one or more reflectance values representative of at least the portion of the interior space. For example, with respect to the multi-view sensing pipeline 100 of FIG. 1, in some embodiments, the reflectance extraction component 170 uses the sets of frames of sensor data 155 (e.g., sets of images from different perspectives and with different illumination patterns) to extract reflectance data such as a BRDF or one or more reflectance maps representing the reflectance of one or more surfaces in the environment (e.g., surfaces of occupants or other monitored subjects, surfaces of the interior space, etc.).

The method 500, at block B506, includes executing one or more operations of the ego-machine based at least on the reflectance data. For example, with respect to the multi-view sensing pipeline 100 of FIG. 1, the image data generation component 175 may use the reflectance data to generate image data (e.g., HDR images, re-rendered images, etc.), and the generated image data may be used in one or more downstream tasks 190.

FIG. 6 is a flow diagram showing a method 600 for executing one or more operations of an ego-machine based at least on a representation of a reconstructed 3D surface in the interior space of the ego-machine, in accordance with some embodiments of the present disclosure. The method 600, at block B602, includes generating, using a plurality of optical sensors and light emitters distributed within an interior space of an ego-machine, image data representing at least a portion of the interior space. For example, with respect to the multi-view sensing pipeline 100 of FIG. 1, the synchronization component 120 may cycle and synchronize the emitters 160 with the optical sensors 150 to generate sets of frames of sensor data 155 representing multiple views of the same target region and multiple illumination patterns in what may be assumed to be substantially the same time slice.

The method 600, at block B604, includes generating, based at least on the image data, a reconstructed three-dimensional (3D) surface corresponding to at least a portion of the interior space. For example, with respect to the multi-view sensing pipeline 100 of FIG. 1, the 3D reconstruction component 180 may use the sensor data 155 to reconstruct the 3D geometry of one or more surfaces in the environment (e.g., surfaces of occupants or other monitored subjects, surfaces of the interior space, etc.).

The method 600, at block B606, includes controlling, by an occupant or occupant monitoring system, one or more operations of the ego-machine based at least on the reconstructed 3D surface. For example, with respect to the multi-view sensing pipeline 100 of FIG. 1, the shape extraction component 185 may extract a 3D pose, landmarks, or some other representation of the shape of the reconstructed surface(s), and the extracted shape may be used in one or more downstream tasks 190.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, generative AI, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models-such as one or more large language models (LLMs), systems for performing light transport simulation, systems for performing collaborative content creation for 3D assets, systems implemented at least partially using cloud computing resources, and/or other types of systems.

Example Autonomous Vehicle

Figure 7A:
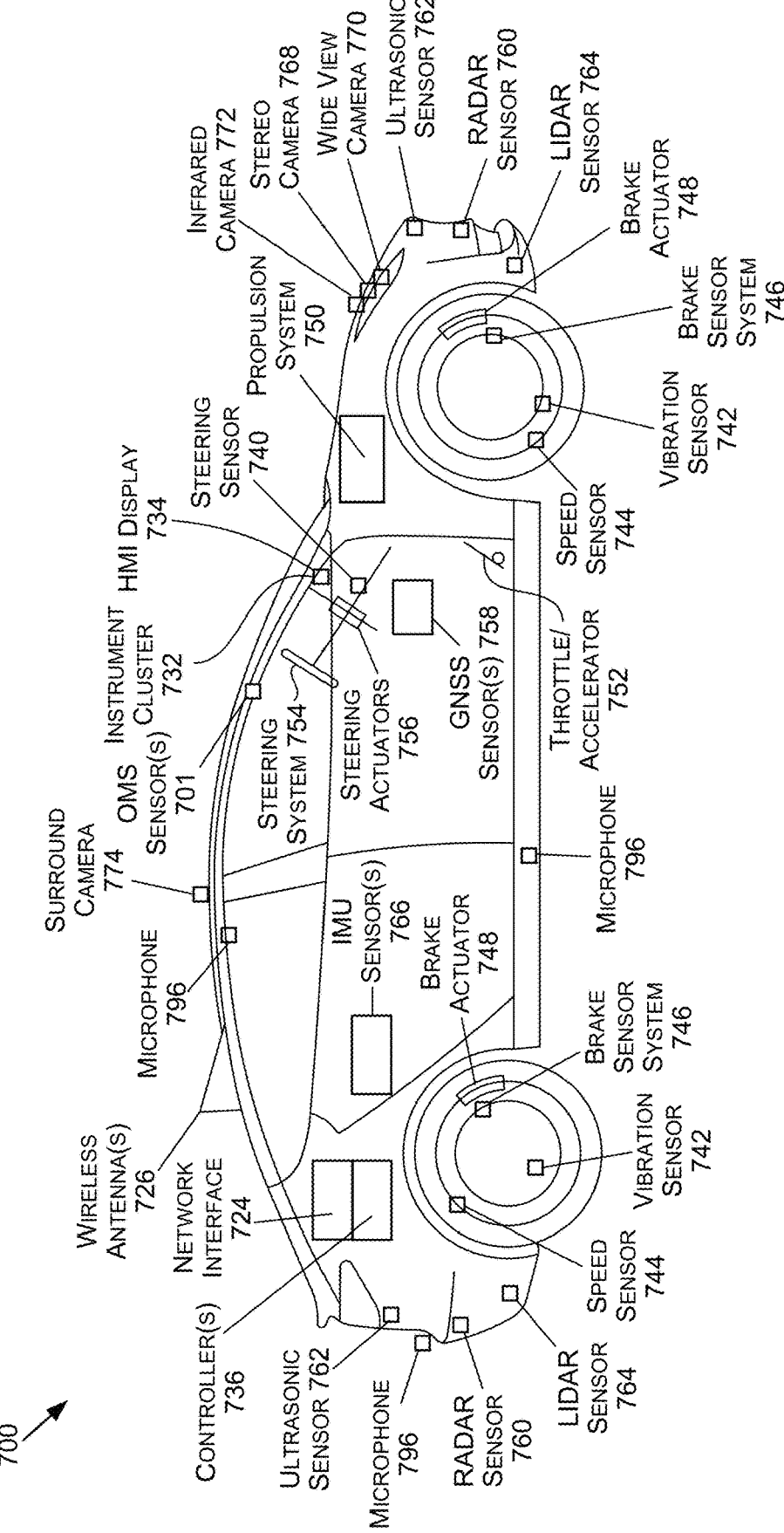
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. The vehicle 700 may be capable of functionality in accordance with one or more of Level 1-Level 5 of the autonomous driving levels. For example, the vehicle 700 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 700 or other machine, such as being fully autonomous, being highly autonomous, being conditionally autonomous, being partially autonomous, providing assistive autonomy, being semi-autonomous, being primarily autonomous, or other designation.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to allow the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to allow autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems ("GNSS") sensor(s) 758 (e.g., Global Positioning System sensor(s)), RADAR sensor(s) 760, ultrasonic sensor(s) 762, LiDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), one or more occupant monitoring system (OMS) sensor(s) 701 (e.g., one or more interior cameras), and/or other sensor types.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the High Definition ("HD") map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 726 may also allow communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 7B:
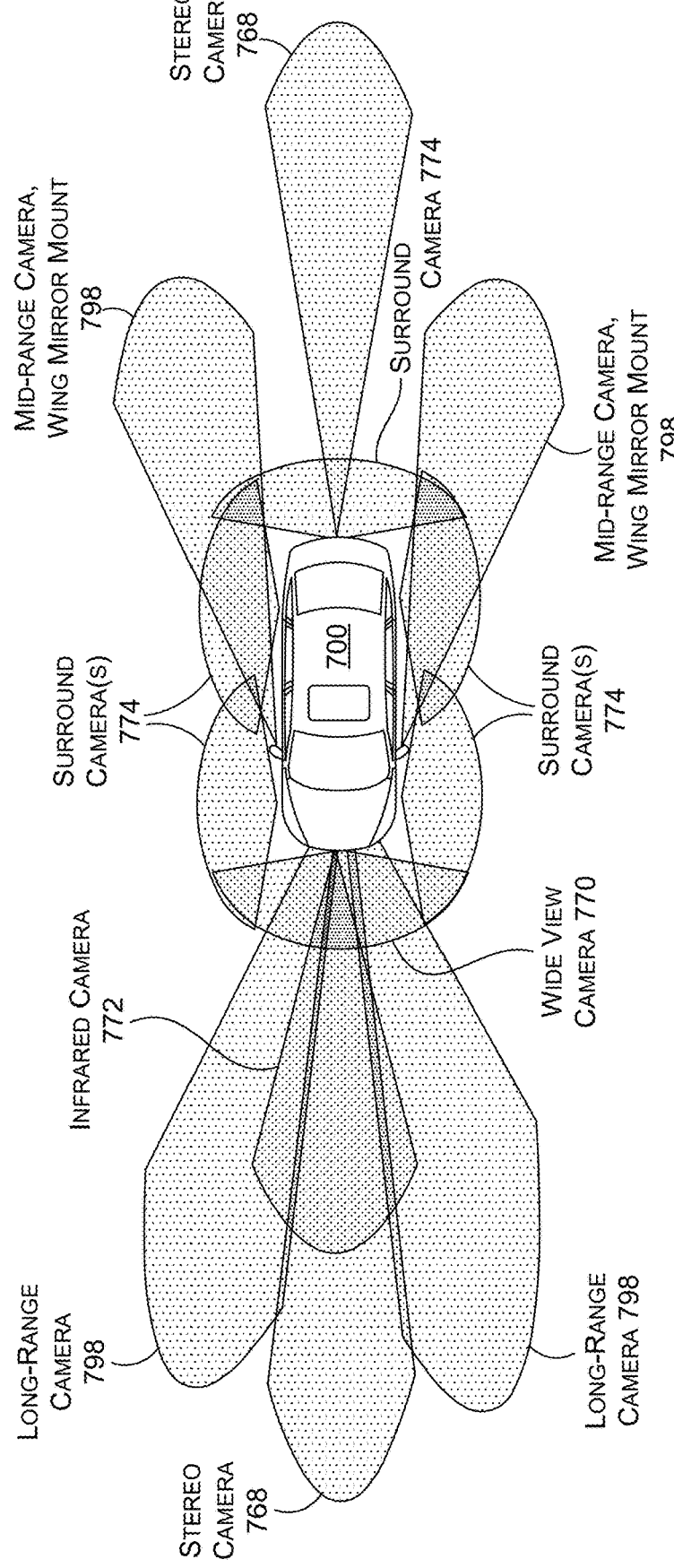
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may be any number (including zero) of wide-view cameras 770 on the vehicle 700. In addition, any number of long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

Any number of stereo cameras 768 may also be included in a front-facing configuration. In at least one embodiment, one or more of stereo camera(s) 768 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Cameras with a field of view that include portions of the interior environment within the cabin of the vehicle 700 (e.g., one or more OMS sensor(s) 701) may be used as part of an occupant monitoring system (OMS) such as, but not limited to, a driver monitoring system (DMS). For example, OMS sensors (e.g., the OMS sensor(s) 701) may be used (e.g., by the controller(s) 736) to track an occupant's and/or driver's gaze direction, head pose, and/or blinking. This gaze information may be used to determine a level of attentiveness of the occupant or driver (e.g., to detect drowsiness, fatigue, and/or distraction), and/or to take responsive action to prevent harm to the occupant or operator. In some embodiments, data from OMS sensors may be used to allow gaze-controlled operations triggered by driver and/or non-driver occupants such as, but not limited to, adjusting cabin temperature and/or airflow, opening and closing windows, controlling cabin lighting, controlling entertainment systems, adjusting mirrors, adjusting seat positions, and/or other operations. In some embodiments, an OMS may be used for applications such as determining when objects and/or occupants have been left behind in a vehicle cabin (e.g., by detecting occupant presence after the driver exits the vehicle).

Figure 7C:
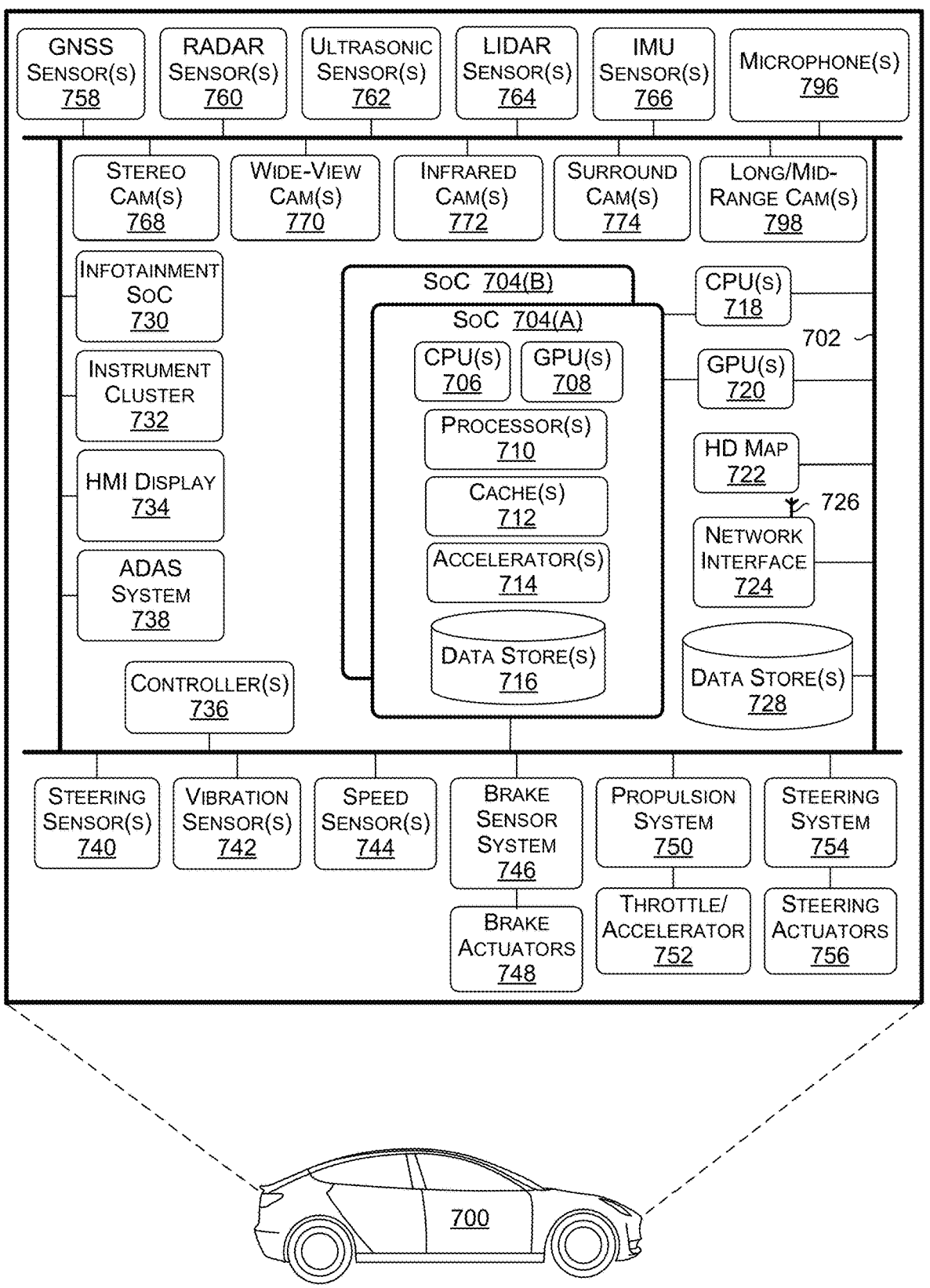
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation allowing any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to allow finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))—or other math coprocessor or numeric coprocessor types—for performing mathematical operations within the system. For example, the SoC(s) 704 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may allow the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may allow components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. As such, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LiDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 716 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to allow communication with peripherals, audio codecs, power management, and/or other devices. The SoC(s) 704 may be used to process data from cameras (e.g., connected over Gigabit Multimedia Serial Link and Ethernet), sensors (e.g., LiDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to allow Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to allow wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS, assisted GPS sensors, differential GPS (DGPS) sensors, etc.), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated using the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LiDAR sensor(s) 764. The LiDAR sensor(s) 764 may be used for object and pedestrian detection, emergency braking, collision avoidance, and/or other functions. The LiDAR sensor(s) 764 may be functional safety level ASIL B. In some examples, the vehicle 700 may include multiple LiDAR sensors 764 (e.g., two, four, six, etc.) that may use Ethernet (e.g., to provide data to a Gigabit Ethernet switch).

In some examples, the LiDAR sensor(s) 764 may be capable of providing a list of objects and their distances for a 360-degree field of view. Commercially available LiDAR sensor(s) 764 may have an advertised range of approximately 700 m, with an accuracy of 2 cm-3 cm, and with support for a 700 Mbps Ethernet connection, for example. In some examples, one or more non-protruding LiDAR sensors 764 may be used. In such examples, the LiDAR sensor(s) 764 may be implemented as a small device that may be embedded into the front, rear, sides, and/or corners of the vehicle 700. The LiDAR sensor(s) 764, in such examples, may provide up to a 120-degree horizontal and 35-degree vertical field-of-view, with a 200 m range even for low-reflectivity objects. Front-mounted LiDAR sensor(s) 764 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 700. Available 3D flash LiDAR systems include a solid-state 3D staring array LiDAR camera with no moving parts other than a fan (e.g., a non-scanning LiDAR device). The flash LiDAR device may use a 5 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may allow the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LiDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. As such, the instrument cluster 732 may be included as part of the infotainment SoC 730, or vice versa.

Figure 7D:
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(D) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated using the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
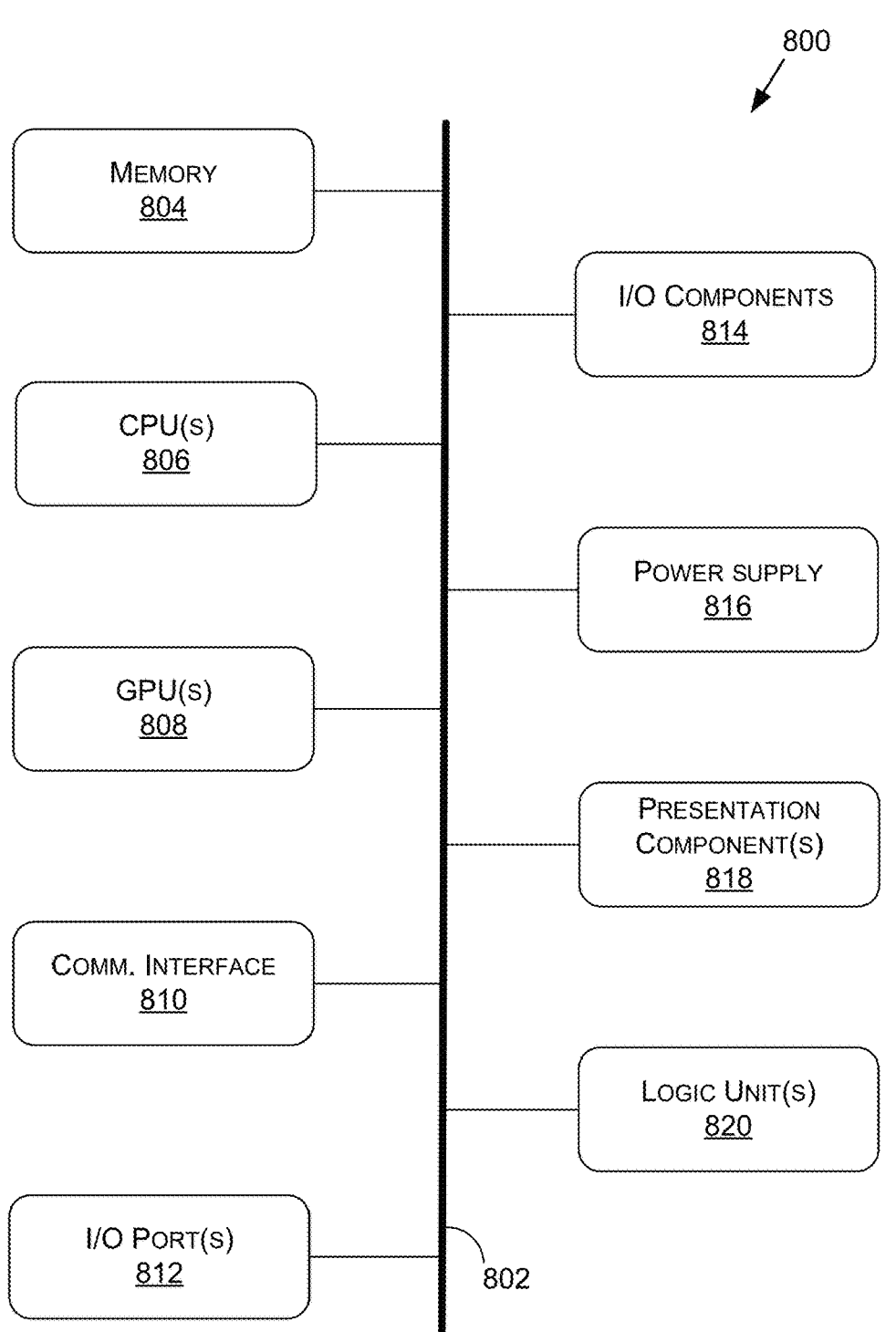
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). As such, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that allow the computing device 800 to communicate with other computing devices via an electronic communication network, included wired and/or wireless communications. The communication interface 810 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may allow the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that allow detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to allow the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
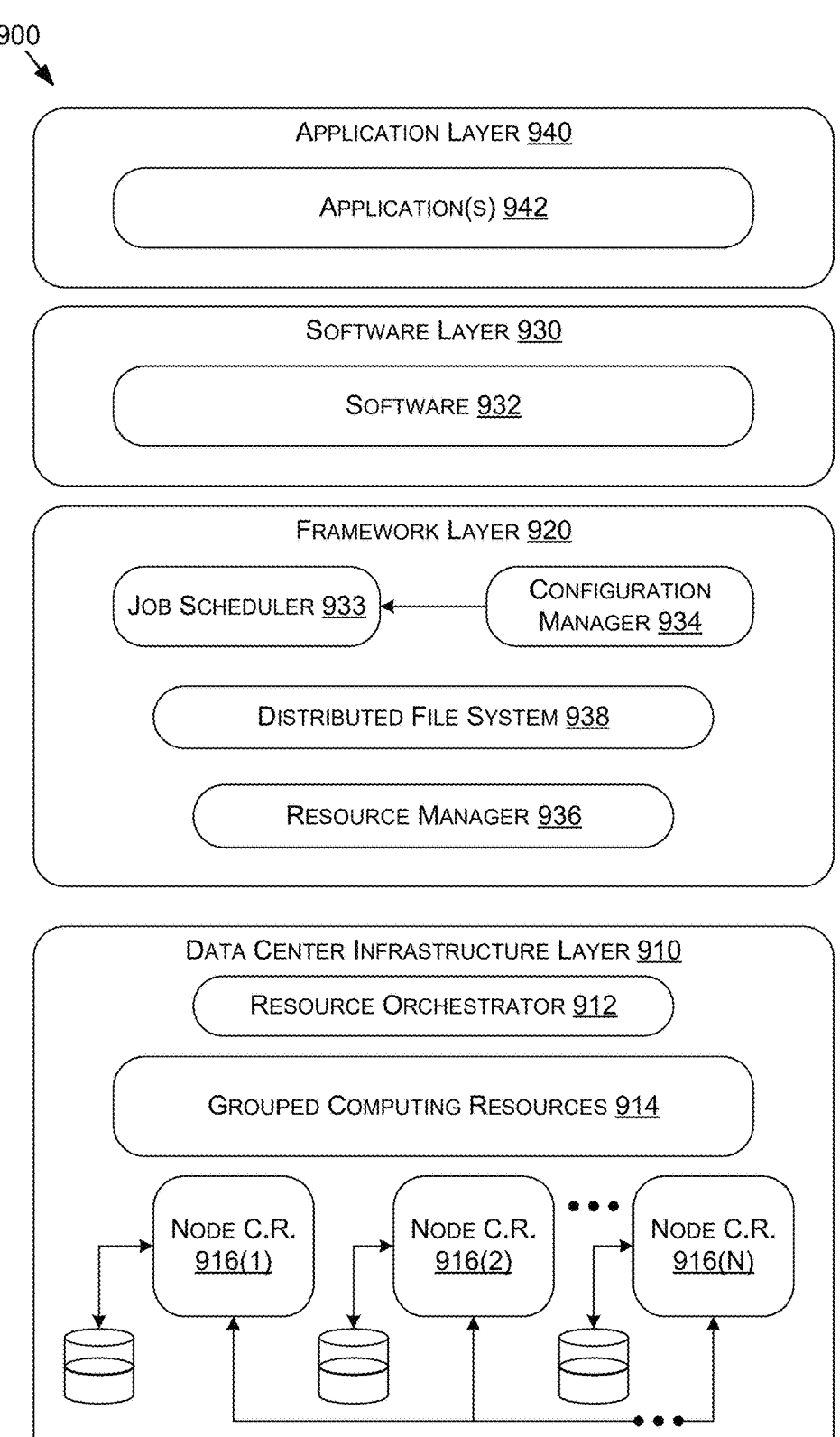
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 933, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may use distributed file system 938 for large-scale data processing (e.g., "big data"). In at least one embodiment, job scheduler 933 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 933. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types.

The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Example Literal Support

The disclosure of this application also includes the following numbered clauses:

Clause 1. One or more processors comprising processing circuitry to generate, using a plurality of optical sensors synchronized with light emitters distributed within an interior space of an ego-machine, image data representing at least a portion of the interior space.

Clause 2. The one or more processors of clause 1, wherein the processing circuitry is further to extract, based at least on the image data, reflectance data encoding one or more reflectance values representative of at least the portion of the interior space.

Clause 3. The one or more processors of clause 1 or 2, wherein the processing circuitry is further to execute one or more operations of the ego-machine based at least on the reflectance data.

Clause 4. The one or more processors of clause 1, 2 or 3, wherein the one or more operations of the ego-machine comprise generating one or more high dynamic range (HDR) images of at least the portion of the interior space based at least on the reflectance data.

Clause 5. The one or more processors of clause 1, 2 or 3, wherein the reflectance data encodes an extracted bidirectional reflectance distribution function (BRDF) representative of at least the portion of the interior space.

Clause 6. The one or more processors of clause 1, 2 or 3, wherein the one or more operations of the ego-machine comprise re-rendering initial image data of at least the portion of the interior space using an extracted BRDF encoded by the reflectance data.

Clause 7. The one or more processors of clause 1, 2 or 3, wherein the reflectance data comprises one or more reflectance maps encoding the one or more reflectance values representative of at least the portion of the interior space.

Clause 8. The one or more processors of clause 1, 2 or 3, wherein the one or more operations of the ego-machine comprise one or more operator or occupant monitoring or detection tasks that evaluate rendered image data generated using the reflectance data.

Clause 9. The one or more processors of clause 1, 2 or 3, wherein the light emitters distributed within the interior space are associated with corresponding filters, wherein at least two filters of the corresponding filters pass different frequency bands.

Clause 10. The one or more processors of clause 1, 2 or 3, wherein the image data comprises a plurality of frames representing multiple views of at least the portion of the interior space and multiple illumination patterns in substantially the same time slice.

Clause 11. The one or more processors of clause 1, 2 or 3, wherein the one or more processors are comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system for performing remote operations; a system for performing real-time streaming; a system for generating or presenting one or more of augmented reality content, virtual reality content, or mixed reality content; a system implemented using an edge device; a system implemented using a robot; a system for performing conversational AI operations; a system implementing one or more language models; a system implementing one or more large language models (LLMs); a system implementing one or more vision language models (VLMs); a system implementing one or more multi-modal language models; a system for generating synthetic data; a system for generating synthetic data using AI; a system incorporating one or more virtual machines (VMs); a system implemented at least partially in a data center; or a system implemented at least partially using cloud computing resources.

Clause 12. A system comprising one or more processors to execute one or more operations of an ego-machine based at least on reflectance data representative of at least a portion of an interior space of the ego-machine, the reflectance data extracted using a plurality of optical sensors synchronized with light emitters distributed within the interior space.

Clause 13. The system of clause 12, wherein the one or more operations of the ego-machine comprise generating one or more high dynamic range (HDR) images of at least the portion of the interior space based at least on the reflectance data.

Clause 14. The system of clause 12, wherein the reflectance data encodes an extracted bidirectional reflectance distribution function (BRDF) representative of the interior space.

Clause 15. The system of clause 12, wherein the one or more operations of the ego-machine comprise re-rendering initial image data of at least the portion of the interior space using an extracted BRDF encoded by the reflectance data.

Clause 16. The system of clause 12, wherein the reflectance data comprises one or more reflectance maps encoding one or more reflectance values representative of at least the portion of the interior space.

Clause 17. The system of clause 12, wherein the one or more operations of the ego-machine comprise one or more operator or occupant monitoring or detection tasks that evaluate rendered image data generated using the reflectance data.

Clause 18. The system of clause 12, wherein the light emitters distributed within the interior space are associated with corresponding filters, wherein at least two filters of the corresponding filters pass different frequency bands.

Clause 19. The system of clause 12, the reflectance data generated based at least on image data comprising a plurality of frames representing multiple views of at least the portion of the interior space and multiple illumination patterns in substantially the same time slice.

Clause 20. The system of clause 12, wherein the system is comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system for performing remote operations; a system for performing real-time streaming; a system for generating or presenting one or more of augmented reality content, virtual reality content, or mixed reality content; a system implemented using an edge device; a system implemented using a robot; a system for performing conversational AI operations; a system implementing one or more language models; a system implementing one or more large language models (LLMs); a system implementing one or more vision language models (VLMs); a system implementing one or more multi-modal language models; a system for generating synthetic data; a system for generating synthetic data using AI; a system incorporating one or more virtual machines (VMs); a system implemented at least partially in a data center; or a system implemented at least partially using cloud computing resources.

Clause 21. A method comprising generating, using a plurality of optical sensors synchronized with light emitters distributed within an interior space of an ego-machine, reflectance data encoding one or more reflectance values representative of at least a portion of the interior space.

Clause 22. The method of clause 21, further comprising executing one or more operations of the ego-machine based at least on the reflectance data.

Clause 23. The method of clause 21 or 22, wherein the method is performed by at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system for performing remote operations; a system for performing real-time streaming; a system for generating or presenting one or more of augmented reality content, virtual reality content, or mixed reality content; a system implemented using an edge device; a system implemented using a robot; a system for performing conversational AI operations; a system implementing one or more language models; a system implementing one or more large language models (LLMs); a system implementing one or more vision language models (VLMs); a system implementing one or more multi-modal language models; a system for generating synthetic data; a system for generating synthetic data using AI; a system incorporating one or more virtual machines (VMs); a system implemented at least partially in a data center; or a system implemented at least partially using cloud computing resources.

Clause 24. One or more processors comprising processing circuitry to generate, using a plurality of optical sensors and light emitters distributed within an interior space of an ego-machine, image data representing at least a portion of the interior space.

Clause 25. The one or more processors of clause 24, wherein the processing circuitry is further to generate, based at least on the image data, a reconstructed three-dimensional (3D) surface corresponding to at least the portion of the interior space.

Clause 26. The one or more processors of clause 24 or 25, wherein the processing circuitry is further to control, by an occupant or operator monitoring system, one or more operations of the ego-machine based at least on the reconstructed 3D surface.

Clause 27. The one or more processors of clause 24, 25 or 26, wherein the one or more operations comprise reconstructing a 3D pose of an occupant or operator of the ego-machine based at least on the reconstructed 3D surface.

Clause 28. The one or more processors of clause 24, 25 or 26, wherein the one or more operations of the ego-machine comprise one or more operator or occupant monitoring or detection tasks that evaluate a 3D pose generated using the reconstructed 3D surface.

Clause 29. The one or more processors of clause 24, 25 or 26, the light emitters comprising one or more infrared (IR) emitters disposed behind one or more displays of the ego-machine.

Clause 30. The one or more processors of clause 24, 25 or 26, the light emitters comprising one or more infrared (IR) emitters disposed inside one or more light fixtures of the ego-machine.

Clause 31. The one or more processors of clause 24, 25 or 26, the light emitters comprising one or more infrared (IR) emitters positioned inside one or more footwell light fixtures of the ego-machine.

Clause 32. The one or more processors of clause 24, 25 or 26, wherein the processing circuitry is further to adapt an intensity of light output by one or more of the light emitters based at least on a detected gradient of ambient light in the interior space.

Clause 33. The one or more processors of clause 24, 25 or 26, wherein the processing circuitry is further to control an intensity of light output by a first set of the light emitters illuminating a first target region of the interior space independently of a second set of the light emitters illuminating a second target region of the interior space.

Clause 34. The one or more processors of clause 24, 25 or 26, wherein the image data comprises a plurality of frames of sensor data representing multiple views of the interior space and multiple illumination patterns in substantially the same time slice.

Clause 35. The one or more processors of clause 24, 25 or 26, wherein the one or more processors are comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system for performing remote operations; a system for performing real-time streaming; a system for generating or presenting one or more of augmented reality content, virtual reality content, or mixed reality content; a system implemented using an edge device; a system implemented using a robot; a system for performing conversational AI operations; a system implementing one or more language models; a system implementing one or more large language models (LLMs); a system implementing one or more vision language models (VLMs); a system implementing one or more multi-modal language models; a system for generating synthetic data; a system for generating synthetic data using AI; a system incorporating one or more virtual machines (VMs); a system implemented at least partially in a data center; or a system implemented at least partially using cloud computing resources.

Clause 36. A system comprising one or more processors to execute one or more operations of an ego-machine based at least on a three-dimensional (3D) surface of at least a portion of an interior space reconstructed using a plurality of optical sensors and light emitters distributed within with interior space.

Clause 37. The system of clause 36, wherein the one or more operations comprise reconstructing a 3D pose of an occupant or operator of the ego-machine based at least on the 3D surface.

Clause 38. The system of clause 36, wherein the one or more operations of the ego-machine comprise one or more operator or occupant monitoring or detection tasks that evaluate a 3D pose generated using the 3D surface.

Clause 39. The system of clause 36, the light emitters comprising one or more infrared (IR) emitters disposed behind one or more displays of the ego-machine.

Clause 40. The system of clause 36, the light emitters comprising one or more infrared (IR) emitters disposed inside one or more light fixtures of the ego-machine.

Clause 41. The system of clause 36, the light emitters comprising one or more infrared (IR) emitters positioned inside one or more footwell light fixtures of the ego-machine.

Clause 42. The system of clause 36, wherein the one or more processors are further to adapt an intensity of light output by one or more of the light emitters based at least on a detected gradient of ambient light in the interior space.

Clause 43. The system of clause 36, wherein the system is comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system for performing remote operations;

a system for performing real-time streaming; a system for generating or presenting one or more of augmented reality content, virtual reality content, or mixed reality content; a system implemented using an edge device; a system implemented using a robot; a system for performing conversational AI operations; a system implementing one or more language models; a system implementing one or more large language models (LLMs); a system implementing one or more vision language models (VLMs); a system implementing one or more multi-modal language models; a system for generating synthetic data; a system for generating synthetic data using AI; a system incorporating one or more virtual machines (VMs); a system implemented at least partially in a data center; or a system implemented at least partially using cloud computing resources.

Clause 44. A method comprising generating, using a plurality of optical sensors and light emitters distributed within an interior space of an ego-machine, a reconstructed three-dimensional (3D) surface of at least a portion of the interior space.

Clause 45. The method of clause 44, further comprising executing one or more operations of the ego-machine based at least on the reconstructed 3D surface.

Clause 46. The method of clause 44 or 45, wherein the method is performed by at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system for performing remote operations; a system for performing real-time streaming; a system for generating or presenting one or more of augmented reality content, virtual reality content, or mixed reality content; a system implemented using an edge device; a system implemented using a robot; a system for performing conversational AI operations; a system implementing one or more language models; a system implementing one or more large language models (LLMs); a system implementing one or more vision language models (VLMs); a system implementing one or more multi-modal language models; a system for generating synthetic data; a system for generating synthetic data using AI; a system incorporating one or more virtual machines (VMs); a system implemented at least partially in a data center; or a system implemented at least partially using cloud computing resources.

What is claimed is:

1. One or more processors comprising processing circuitry to:

generate, using a plurality of optical sensors synchronized with light emitters distributed within an interior space of an ego-machine, image data representing at least a portion of the interior space;

extract, based at least on the image data, reflectance data encoding one or more reflectance values representative of at least the portion of the interior space; and execute one or more operations of the ego-machine based at least on the reflectance data.

2. The one or more processors of claim 1, wherein the one or more operations of the ego-machine comprise generating one or more high dynamic range (HDR) images of at least the portion of the interior space based at least on the reflectance data.

3. The one or more processors of claim 1, wherein the reflectance data encodes an extracted bidirectional reflectance distribution function (BRDF) representative of at least the portion of the interior space.

4. The one or more processors of claim 1, wherein the one or more operations of the ego-machine comprise re-rendering initial image data of at least the portion of the interior space using an extracted BRDF encoded by the reflectance data.

5. The one or more processors of claim 1, wherein the reflectance data comprises one or more reflectance maps encoding the one or more reflectance values representative of at least the portion of the interior space.

6. The one or more processors of claim 1, wherein the one or more operations of the ego-machine comprise one or more operator or occupant monitoring or detection tasks that evaluate rendered image data generated using the reflectance data.

7. The one or more processors of claim 1, wherein the light emitters distributed within the interior space are associated with corresponding filters, wherein at least two filters of the corresponding filters pass different frequency bands.

8. The one or more processors of claim 1, wherein the image data comprises a plurality of frames representing multiple views of at least the portion of the interior space and multiple illumination patterns in substantially the same time slice.

9. The one or more processors of claim 1, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for performing remote operations;

a system for performing real-time streaming;

a system for generating or presenting one or more of augmented reality content, virtual reality content, or mixed reality content;

a system implemented using an edge device;

a system implemented using a robot;

a system for performing conversational AI operations;

a system implementing one or more language models;

a system implementing one or more large language models (LLMs);

a system implementing one or more vision language models (VLMs);

a system implementing one or more multi-modal language models;

a system for generating synthetic data;

a system for generating synthetic data using AI;

a system incorporating one or more virtual machines (VMs);

a system implemented at least partially in a data center; or a system implemented at least partially using cloud computing resources.

10. A system comprising one or more processors to execute one or more operations of an ego-machine based at least on reflectance data representative of at least a portion of an interior space of the ego-machine, the reflectance data extracted using a plurality of optical sensors synchronized with light emitters distributed within the interior space.

11. The system of claim 10, wherein the one or more operations of the ego-machine comprise generating one or more high dynamic range (HDR) images of at least the portion of the interior space based at least on the reflectance data.

12. The system of claim 10, wherein the reflectance data encodes an extracted bidirectional reflectance distribution function (BRDF) representative of the interior space.

13. The system of claim 10, wherein the one or more operations of the ego-machine comprise re-rendering initial image data of at least the portion of the interior space using an extracted BRDF encoded by the reflectance data.

14. The system of claim 10, wherein the reflectance data comprises one or more reflectance maps encoding one or more reflectance values representative of at least the portion of the interior space.

15. The system of claim 10, wherein the one or more operations of the ego-machine comprise one or more operator or occupant monitoring or detection tasks that evaluate rendered image data generated using the reflectance data.

16. The system of claim 10, wherein the light emitters distributed within the interior space are associated with corresponding filters, wherein at least two filters of the corresponding filters pass different frequency bands.

17. The system of claim 10, the reflectance data generated based at least on image data comprising a plurality of frames representing multiple views of at least the portion of the interior space and multiple illumination patterns in substantially the same time slice.

18. The system of claim 11, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for performing remote operations;

a system for performing real-time streaming;

a system for generating or presenting one or more of augmented reality content, virtual reality content, or mixed reality content;

a system implemented using an edge device;

a system implemented using a robot;

a system for performing conversational AI operations;

a system implementing one or more language models;

a system implementing one or more large language models (LLMs);

a system implementing one or more vision language models (VLMs);

a system implementing one or more multi-modal language models;

a system for generating synthetic data;

a system for generating synthetic data using AI;

a system incorporating one or more virtual machines (VMs);

a system implemented at least partially in a data center; or a system implemented at least partially using cloud computing resources.

19. A method comprising:

generating, using a plurality of optical sensors synchronized with light emitters distributed within an interior space of an ego-machine, reflectance data encoding one or more reflectance values representative of at least a portion of the interior space; and executing one or more operations of the ego-machine based at least on the reflectance data.

20. The method of claim 19, wherein the method is performed by at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for performing remote operations;

a system for performing real-time streaming;

a system for generating or presenting one or more of augmented reality content, virtual reality content, or mixed reality content;

a system implemented using an edge device;

a system implemented using a robot;

a system for performing conversational AI operations;

a system implementing one or more language models;

a system implementing one or more large language models (LLMs);

a system implementing one or more vision language models (VLMs);

a system implementing one or more multi-modal language models;

a system for generating synthetic data;

a system for generating synthetic data using AI;

a system incorporating one or more virtual machines (VMs);

a system implemented at least partially in a data center; or a system implemented at least partially using cloud computing resources.

\* \* \* \* \*